(12) United States Patent
Bone et al.

(10) Patent No.: US 10,209,486 B2
(45) Date of Patent: Feb. 19, 2019

(54) OPTICAL LENS ASSEMBLY

(71) Applicant: Genius Electronic Optical Co., Ltd., Taichung (TW)

(72) Inventors: Matthew Bone, Fujian (CN); Guangyun Li, Fujian (CN); Yanbin Chen, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 2 days.

(21) Appl. No.: 15/435,308

(22) Filed: Feb. 17, 2017

(65) Prior Publication Data

US 2018/0210174 A1 Jul. 26, 2018

(30) Foreign Application Priority Data

Jan. 24, 2017 (CN) .......................... 2017 1 0059290

(51) Int. Cl.
*G02B 13/00* (2006.01)
(52) U.S. Cl.
CPC ............... *G02B 13/0045* (2013.01)

(58) Field of Classification Search
CPC ................................................. G02B 13/0045
USPC ......................................................... 359/714
See application file for complete search history.

(56) References Cited

U.S. PATENT DOCUMENTS 9,213,167 B2 * 12/2015 Chen .................... H04N 5/2252

\* cited by examiner

*Primary Examiner* — Evan Dzierzynski
*Assistant Examiner* — Mitchell Oestreich
(74) *Attorney, Agent, or Firm* — JCIPRNET

(57) ABSTRACT

An optical lens assembly includes first, second, third, fourth and fifth lens elements arranged in sequence from an object side to an image side along an optical axis. Only the first lens element to the fifth lens element have refracting power, wherein the optical lens assembly satisfies: $3.1 \leq ALT/AAG$, wherein ALT is a sum of thicknesses of the first lens element, the second lens element, the third lens element, the fourth lens element, and the fifth lens element on the optical axis, and AAG is a sum of four air gaps from the first lens element to the fifth lens element on the optical axis.

20 Claims, 24 Drawing Sheets

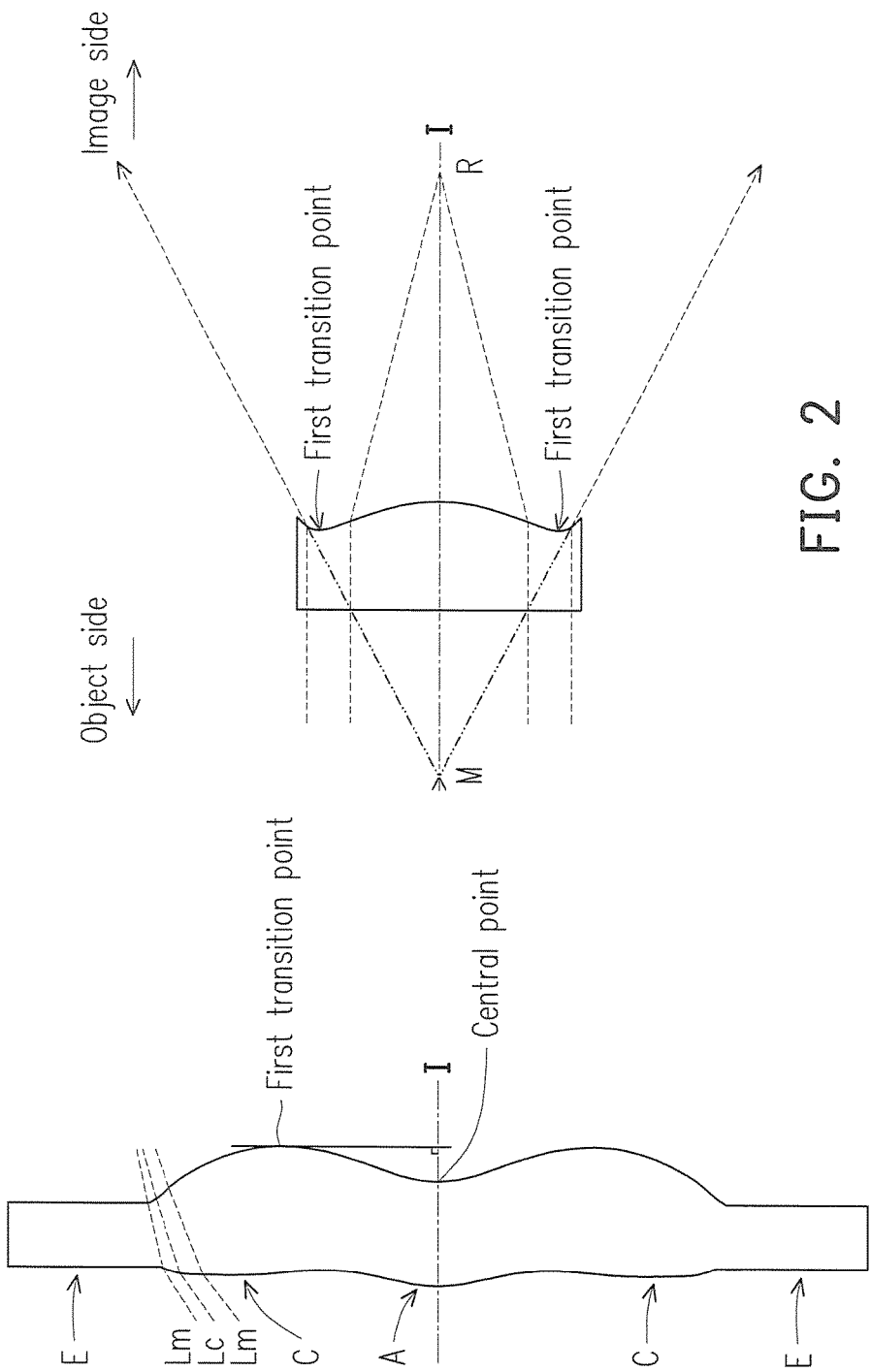

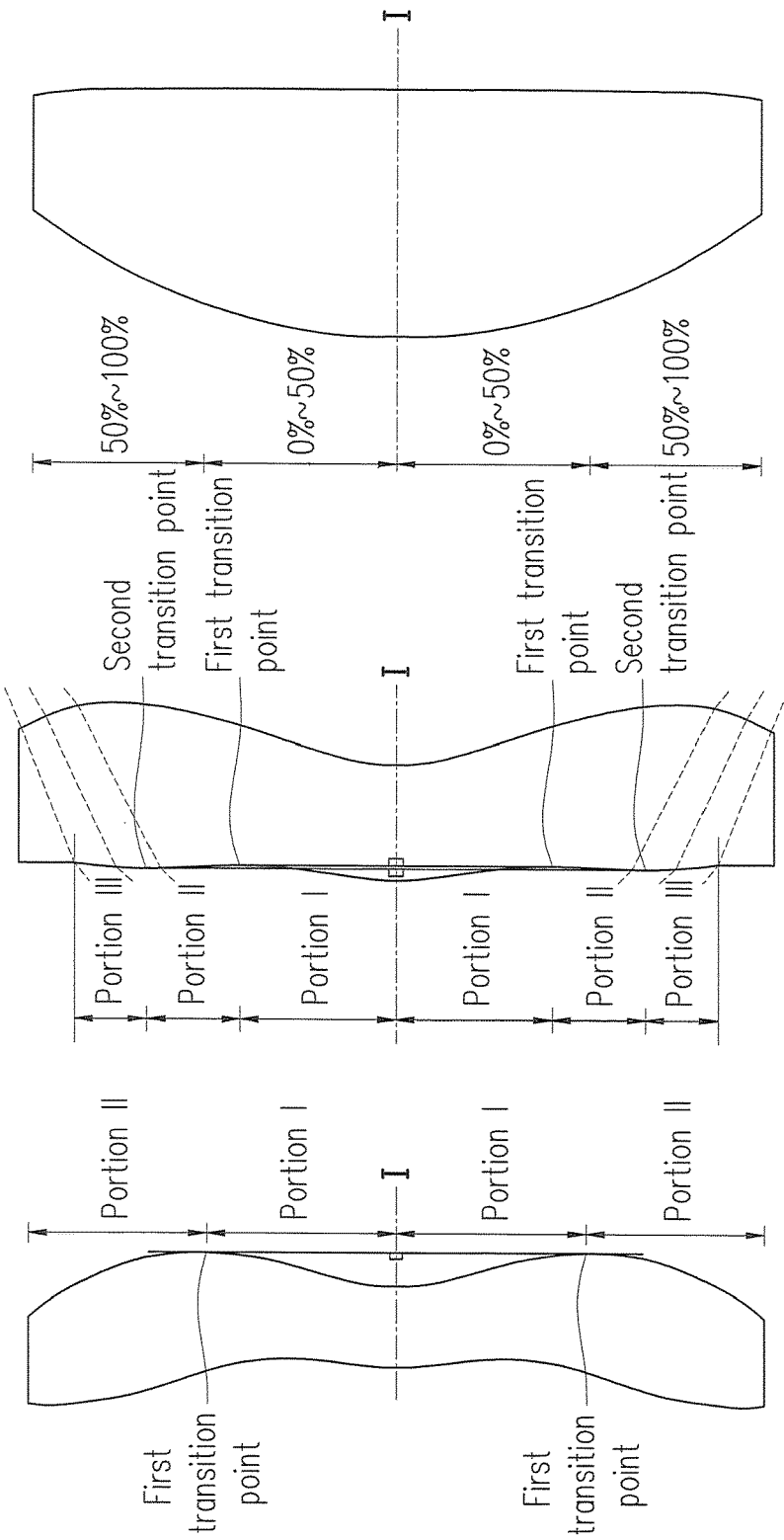

| First embodiment |||||||
|---|---|---|---|---|---|---|
| Effective focal length=2.873 mm, Half field of view=37.002°, |||||||
| System length=3.386 mm, F-number=2.441, Image height= 2.191 mm |||||||
| Lens Element | Surface | Radius of curvature (mm) | Thickness (mm) | Index of refraction | Abbe number | Focal Length (mm) |
| Object | | Infinite | 10000 | | | |
| Aperture stop 2 | | Infinite | -0.120 | | | |
| First lens element 3 | Object-side surface 31 | 1.250 | 0.498 | 1.545 | 55.987 | 3.002 |
| | Image-side surface 32 | 4.512 | 0.065 | | | |
| Second lens element 4 | Object-side surface 41 | 2.802 | 0.239 | 1.661 | 20.401 | -6.594 |
| | Image-side surface 42 | 1.653 | 0.149 | | | |
| Third lens element 5 | Object-side surface 51 | 3.562 | 0.419 | 1.545 | 55.987 | 11.980 |
| | Image-side surface 52 | 7.491 | 0.189 | | | |
| Fourth lens element 6 | Object-side surface 61 | -3.067 | 0.407 | 1.545 | 55.987 | 1.961 |
| | Image-side surface 62 | -0.831 | 0.067 | | | |
| Fifth lens element 7 | Object-side surface 71 | 5.840 | 0.413 | 1.535 | 55.690 | -1.722 |
| | Image-side surface 72 | 0.778 | 0.500 | | | |
| Filter 9 | Object-side surface 91 | Infinite | 0.210 | 1.517 | 64.167 | |
| | Image-side surface 92 | Infinite | 0.231 | | | |
| | Image plane 100 | Infinite | | | | |

FIG.8

| Surface | K | $a_2$ | $a_4$ | $a_6$ | $a_8$ |
|---|---|---|---|---|---|
| 31 | -3.947344E-02 | 0.000000E+00 | 3.016658E-02 | 3.277626E-03 | -3.288553E-01 |
| 32 | 0.000000E+00 | 0.000000E+00 | -2.821384E-01 | 4.936577E-01 | -7.444179E-01 |
| 41 | 0.000000E+00 | 0.000000E+00 | -4.024701E-01 | 5.259963E-01 | -1.003711E+00 |
| 42 | 1.724803E+00 | 0.000000E+00 | -2.792396E-01 | 3.434347E-01 | -1.932642E-01 |
| 51 | 0.000000E+00 | 0.000000E+00 | -1.070822E-01 | -1.079025E-01 | 1.231093E-01 |
| 52 | 0.000000E+00 | 0.000000E+00 | -1.093491E-01 | 2.214240E-02 | -5.049335E-01 |
| 61 | 0.000000E+00 | 0.000000E+00 | 0.000000E+00 | 0.000000E+00 | 0.000000E+00 |
| 62 | -3.655794E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | -6.884063E+00 | 0.000000E+00 | 0.000000E+00 | 0.000000E+00 | 0.000000E+00 |
| Surface | $a_{10}$ | $a_{12}$ | $a_{14}$ | $a_{16}$ | |
| 31 | 1.015845E-01 | 8.850927E-01 | 3.859219E+00 | -9.272292E+00 | |
| 32 | 3.888825E-02 | -1.157326E-01 | 2.043402E+00 | 5.489606E+00 | |
| 41 | 1.058751E+00 | 1.104203E+00 | -1.527660E-01 | 1.057872E+00 | |
| 42 | -3.591370E-01 | -2.827375E-02 | 2.513502E+00 | -1.668424E+00 | |
| 51 | 6.917647E-01 | -2.026924E+00 | 1.052318E+00 | 1.344972E-01 | |
| 52 | 2.721443E-01 | 3.181813E-01 | -1.089913E+00 | 9.538276E-01 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |
| 71 | 0.000000E+00 | 0.000000E+00 | 0.000000E+00 | 0.000000E+00 | |
| 72 | 0.000000E+00 | 0.000000E+00 | 0.000000E+00 | 0.000000E+00 | |

FIG.9

| Second embodiment ||||||
| --- | --- | --- | --- | --- | --- |
| Effective focal length=2.020 mm, Half field of view=37.500°, ||||||
| System length=2.797 mm, F-number=2.278, Image height=1.633 mm ||||||
| Lens Element | Surface | Radius of curvature (mm) | Thickness (mm) | Index of refraction | Abbe number | Focal Length (mm) |
| Object | | Infinite | 10000 | | | |
| Aperture stop 2 | | Infinite | -0.087 | | | |
| First lens element 3 | Object-side surface 31 | 1.146 | 0.312 | 1.545 | 55.987 | 2.865 |
| | Image-side surface 32 | 3.868 | 0.063 | | | |
| Second lens element 4 | Object-side surface 41 | 2.386 | 0.202 | 1.661 | 20.401 | -7.479 |
| | Image-side surface 42 | 1.559 | 0.126 | | | |
| Third lens element 5 | Object-side surface 51 | 2.578 | 0.302 | 1.545 | 55.987 | 8.814 |
| | Image-side surface 52 | 5.318 | 0.226 | | | |
| Fourth lens element 6 | Object-side surface 61 | -4.619 | 0.280 | 1.545 | 55.987 | 1.874 |
| | Image-side surface 62 | -0.856 | 0.078 | | | |
| Fifth lens element 7 | Object-side surface 71 | 3.535 | 0.431 | 1.535 | 55.690 | -2.015 |
| | Image-side surface 72 | 0.793 | 0.500 | | | |
| Filter 9 | Object-side surface 91 | Infinite | 0.210 | 1.517 | 64.167 | |
| | Image-side surface 92 | Infinite | 0.067 | | | |
| | Image plane 100 | Infinite | | | | |

FIG.12

| Surface | K | $a_2$ | $a_4$ | $a_6$ | $a_8$ |
|---|---|---|---|---|---|
| 31 | -4.566403E-01 | 0.000000E+00 | -1.209136E-02 | -1.128176E-02 | -2.511042E-01 |
| 32 | 0.000000E+00 | 0.000000E+00 | -3.254950E-01 | 4.280358E-01 | -7.033986E-01 |
| 41 | 0.000000E+00 | 0.000000E+00 | -4.973482E-01 | 5.142796E-01 | -7.198937E-01 |
| 42 | 2.042947E+00 | 0.000000E+00 | -2.979123E-01 | 6.905594E-02 | -8.843694E-01 |
| 51 | 0.000000E+00 | 0.000000E+00 | -1.678797E-01 | 1.087376E-01 | -5.192012E-01 |
| 52 | 0.000000E+00 | 0.000000E+00 | -2.084811E-01 | -2.291595E-01 | -3.714801E-01 |
| 61 | 0.000000E+00 | 0.000000E+00 | 0.000000E+00 | 0.000000E+00 | 0.000000E+00 |
| 62 | -5.846373E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | -6.138064E+00 | 0.000000E+00 | 0.000000E+00 | 0.000000E+00 | 0.000000E+00 |
| Surface | $a_{10}$ | $a_{12}$ | $a_{14}$ | $a_{16}$ | |
| 31 | 7.686958E-01 | 2.504451E+00 | 3.842729E+00 | -6.172006E+01 | |
| 32 | 5.742534E-01 | 1.794661E+00 | 6.116904E+00 | 1.037602E+01 | |
| 41 | 1.538814E+00 | 2.343346E+00 | 4.179131E+00 | 8.054438E+00 | |
| 42 | -9.232807E-01 | -2.853915E-01 | 4.042181E+00 | 8.807285E+00 | |
| 51 | -1.109152E+00 | -4.016603E+00 | 1.818933E-01 | 6.548484E-02 | |
| 52 | 3.654972E-01 | 4.451716E-01 | -7.654821E-01 | 1.480114E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |
| 71 | 0.000000E+00 | 0.000000E+00 | 0.000000E+00 | 0.000000E+00 | |
| 72 | 0.000000E+00 | 0.000000E+00 | 0.000000E+00 | 0.000000E+00 | |

FIG.13

| Third embodiment |||||||
|---|---|---|---|---|---|---|
| | Effective focal length=2.838 mm, Half field of view=37.495°, System length=3.524 mm, F-number=2.643, Image height=2.305 mm |||||||
| Lens Element | Surface | Radius of curvature (mm) | Thickness (mm) | Index of refraction | Abbe number | Focal Length (mm) |
| Object | | Infinite | 10000 | | | |
| Aperture stop 2 | | Infinite | -0.106 | | | |
| First lens element 3 | Object-side surface 31 | 1.289 | 0.478 | 1.545 | 55.987 | 3.058 |
| | Image-side surface 32 | 4.916 | 0.050 | | | |
| Second lens element 4 | Object-side surface 41 | 3.155 | 0.246 | 1.661 | 20.401 | -6.446 |
| | Image-side surface 42 | 1.762 | 0.194 | | | |
| Third lens element 5 | Object-side surface 51 | 4.422 | 0.582 | 1.545 | 55.987 | 11.910 |
| | Image-side surface 52 | 13.164 | 0.171 | | | |
| Fourth lens element 6 | Object-side surface 61 | -2.389 | 0.250 | 1.545 | 55.987 | 1.914 |
| | Image-side surface 62 | -0.754 | 0.068 | | | |
| Fifth lens element 7 | Object-side surface 71 | 4.314 | 0.327 | 1.535 | 55.690 | -1.894 |
| | Image-side surface 72 | 0.801 | 0.500 | | | |
| Filter 9 | Object-side surface 91 | Infinite | 0.210 | 1.517 | 64.167 | |
| | Image-side surface 92 | Infinite | 0.449 | | | |
| | Image plane 100 | Infinite | | | | |

FIG.16

| Surface | K | $a_2$ | $a_4$ | $a_6$ | $a_8$ |
|---|---|---|---|---|---|
| 31 | -2.321270E-01 | 0.000000E+00 | 1.577750E-02 | 1.346106E-02 | -2.217169E-01 |
| 32 | 0.000000E+00 | 0.000000E+00 | -2.710881E-01 | 4.580122E-01 | -8.356032E-01 |
| 41 | 0.000000E+00 | 0.000000E+00 | -4.137410E-01 | 5.820920E-01 | -9.027595E-01 |
| 42 | 2.187149E+00 | 0.000000E+00 | -2.632106E-01 | 2.799108E-01 | -1.015576E-01 |
| 51 | 0.000000E+00 | 0.000000E+00 | -1.099289E-01 | -1.915116E-02 | 9.628662E-02 |
| 52 | 0.000000E+00 | 0.000000E+00 | -9.714664E-02 | -1.570653E-01 | -3.199653E-01 |
| 61 | 0.000000E+00 | 0.000000E+00 | 0.000000E+00 | 0.000000E+00 | 0.000000E+00 |
| 62 | -3.818417E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | -6.488639E+00 | 0.000000E+00 | 0.000000E+00 | 0.000000E+00 | 0.000000E+00 |

| Surface | $a_{10}$ | $a_{12}$ | $a_{14}$ | $a_{16}$ |
|---|---|---|---|---|
| 31 | 4.636618E-01 | 4.625588E-01 | -5.004074E-01 | -3.302657E+00 |
| 32 | 3.164362E-01 | 4.915763E-01 | 2.829214E+00 | 2.678298E+00 |
| 41 | 8.347633E-01 | 7.050703E-01 | 1.593783E-01 | 3.015183E+00 |
| 42 | -2.667080E-01 | -3.725782E-01 | 2.129363E+00 | -1.094965E+00 |
| 51 | 6.384209E-01 | -2.080892E+00 | 1.046763E+00 | 5.366091E-01 |
| 52 | 2.537419E-01 | 1.613190E-01 | -1.204786E+00 | 1.071385E+00 |
| 61 | 0.000000E+00 | 0.000000E+00 | 0.000000E+00 | 0.000000E+00 |
| 62 | 0.000000E+00 | 0.000000E+00 | 0.000000E+00 | 0.000000E+00 |
| 71 | 0.000000E+00 | 0.000000E+00 | 0.000000E+00 | 0.000000E+00 |
| 72 | 0.000000E+00 | 0.000000E+00 | 0.000000E+00 | 0.000000E+00 |

FIG.17

| Fourth embodiment |||||||
|---|---|---|---|---|---|---|
| Effective focal length=2.676 mm, Half field of view=37.499°, |||||||
| System length=3.427 mm, F-number=2.623, Image height=2.189 mm |||||||
| Lens Element | Surface | Radius of curvature (mm) | Thickness (mm) | Index of refraction | Abbe number | Focal Length (mm) |
| Object | | Infinite | 10000 | | | |
| Aperture stop 2 | | Infinite | -0.094 | | | |
| First lens element 3 | Object-side surface 31 | 1.275 | 0.532 | 1.545 | 55.987 | 3.014 |
| | Image-side surface 32 | 4.826 | 0.052 | | | |
| Second lens element 4 | Object-side surface 41 | 2.908 | 0.222 | 1.661 | 20.401 | -6.517 |
| | Image-side surface 42 | 1.689 | 0.139 | | | |
| Third lens element 5 | Object-side surface 51 | 3.668 | 0.409 | 1.545 | 55.987 | 10.615 |
| | Image-side surface 52 | 9.591 | 0.149 | | | |
| Fourth lens element 6 | Object-side surface 61 | -2.893 | 0.457 | 1.545 | 55.987 | 1.878 |
| | Image-side surface 62 | -0.800 | 0.063 | | | |
| Fifth lens element 7 | Object-side surface 71 | 4.736 | 0.408 | 1.535 | 55.690 | -1.822 |
| | Image-side surface 72 | 0.786 | 0.500 | | | |
| Filter 9 | Object-side surface 91 | Infinite | 0.210 | 1.517 | 64.167 | |
| | Image-side surface 92 | Infinite | 0.287 | | | |
| | Image plane 100 | Infinite | | | | |

FIG.20

| Surface | K | $a_2$ | $a_4$ | $a_6$ | $a_8$ |
|---|---|---|---|---|---|
| 31 | -1.814261E-01 | 0.000000E+00 | 1.877764E-02 | 1.129911E-02 | -2.075130E-01 |
| 32 | 0.000000E+00 | 0.000000E+00 | -2.717546E-01 | 4.821030E-01 | -7.705378E-01 |
| 41 | 0.000000E+00 | 0.000000E+00 | -4.128598E-01 | 5.666448E-01 | -9.053283E-01 |
| 42 | 2.224567E+00 | 0.000000E+00 | -2.605221E-01 | 2.946510E-01 | -9.530347E-02 |
| 51 | 0.000000E+00 | 0.000000E+00 | -1.344193E-01 | -4.580880E-02 | 1.679562E-01 |
| 52 | 0.000000E+00 | 0.000000E+00 | -6.504630E-02 | -1.330810E-01 | -3.370473E-01 |
| 61 | 0.000000E+00 | 0.000000E+00 | 0.000000E+00 | 0.000000E+00 | 0.000000E+00 |
| 62 | -3.672155E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | -5.963532E+00 | 0.000000E+00 | 0.000000E+00 | 0.000000E+00 | 0.000000E+00 |

| Surface | $a_{10}$ | $a_{12}$ | $a_{14}$ | $a_{16}$ |
|---|---|---|---|---|
| 31 | 4.637014E-01 | 4.647759E-01 | 7.625775E-02 | -4.395066E+00 |
| 32 | 4.297670E-01 | 4.515123E-01 | 2.262048E+00 | 3.595588E+00 |
| 41 | 8.804605E-01 | 7.604443E-01 | 2.952130E-01 | 2.704557E+00 |
| 42 | -3.275541E-01 | -5.697021E-01 | 1.912891E+00 | -3.369858E-01 |
| 51 | 6.894653E-01 | -2.109781E+00 | 7.659127E-01 | 1.595369E-01 |
| 52 | 2.482812E-01 | 1.584921E-01 | -1.181040E+00 | 1.063691E+00 |
| 61 | 0.000000E+00 | 0.000000E+00 | 0.000000E+00 | 0.000000E+00 |
| 62 | 0.000000E+00 | 0.000000E+00 | 0.000000E+00 | 0.000000E+00 |
| 71 | 0.000000E+00 | 0.000000E+00 | 0.000000E+00 | 0.000000E+00 |
| 72 | 0.000000E+00 | 0.000000E+00 | 0.000000E+00 | 0.000000E+00 |

FIG.21

| Fifth embodiment |||||||
| --- |
| Effective focal length=2.727 mm, Half field of view=36.001°, |||||||
| System length=3.439 mm, F-number=2.586, Image height=2.130 mm |||||||
| Lens Element | Surface | Radius of curvature (mm) | Thickness (mm) | Index of refraction | Abbe number | Focal Length (mm) |
| --- | --- | --- | --- | --- | --- | --- |
| Object | | Infinite | 10000 | | | |
| Aperture stop 2 | | Infinite | -0.106 | | | |
| First lens element 3 | Object-side surface 31 | 1.242 | 0.469 | 1.545 | 55.987 | 2.976 |
| | Image-side surface 32 | 4.562 | 0.046 | | | |
| Second lens element 4 | Object-side surface 41 | 2.838 | 0.206 | 1.661 | 20.401 | -5.672 |
| | Image-side surface 42 | 1.672 | 0.227 | | | |
| Third lens element 5 | Object-side surface 51 | 3.183 | 0.386 | 1.545 | 55.987 | 11.226 |
| | Image-side surface 52 | 6.332 | 0.245 | | | |
| Fourth lens element 6 | Object-side surface 61 | -3.212 | 0.418 | 1.545 | 55.987 | 1.932 |
| | Image-side surface 62 | -0.831 | 0.046 | | | |
| Fifth lens element 7 | Object-side surface 71 | 4.704 | 0.405 | 1.535 | 55.690 | -1.857 |
| | Image-side surface 72 | 0.797 | 0.500 | | | |
| Filter 9 | Object-side surface 91 | Infinite | 0.210 | 1.517 | 64.167 | |
| | Image-side surface 92 | Infinite | 0.279 | | | |
| | Image plane 100 | Infinite | | | | |

FIG.24

| Surface | K | $a_2$ | $a_4$ | $a_6$ | $a_8$ |
|---|---|---|---|---|---|
| 31 | -1.655528E-01 | 0.000000E+00 | 1.550886E-02 | 3.456883E-02 | -2.104687E-01 |
| 32 | 0.000000E+00 | 0.000000E+00 | -2.721890E-01 | 4.373712E-01 | -7.858052E-01 |
| 41 | 0.000000E+00 | 0.000000E+00 | -4.117683E-01 | 5.950080E-01 | -8.973490E-01 |
| 42 | 2.273659E+00 | 0.000000E+00 | -2.555010E-01 | 3.070604E-01 | -8.474533E-02 |
| 51 | 0.000000E+00 | 0.000000E+00 | -1.360169E-01 | -1.138792E-01 | 6.916472E-02 |
| 52 | 0.000000E+00 | 0.000000E+00 | -9.418106E-02 | -1.439242E-01 | -3.092273E-01 |
| 61 | 0.000000E+00 | 0.000000E+00 | 0.000000E+00 | 0.000000E+00 | 0.000000E+00 |
| 62 | -4.021693E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | -6.049764E+00 | 0.000000E+00 | 0.000000E+00 | 0.000000E+00 | 0.000000E+00 |
| Surface | $a_{10}$ | $a_{12}$ | $a_{14}$ | $a_{16}$ | |
| 31 | 3.565750E-01 | 1.903136E-01 | 2.658359E-01 | -1.996252E+00 | |
| 32 | 4.766701E-01 | 5.460648E-01 | 2.434493E+00 | 2.895245E+00 | |
| 41 | 8.374866E-01 | 6.312906E-01 | 3.637287E-01 | 2.997277E+00 | |
| 42 | -3.052258E-01 | -4.462547E-01 | 2.107962E+00 | -5.858891E-01 | |
| 51 | 6.569779E-01 | -1.976434E+00 | 1.125562E+00 | 5.113217E-01 | |
| 52 | 2.832982E-01 | 1.901126E-01 | -1.169957E+00 | 1.067269E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |
| 71 | 0.000000E+00 | 0.000000E+00 | 0.000000E+00 | 0.000000E+00 | |
| 72 | 0.000000E+00 | 0.000000E+00 | 0.000000E+00 | 0.000000E+00 | |

FIG.25

| Sixth embodiment |||||||
|---|---|---|---|---|---|---|
| Effective focal length=3.169 mm, Half field of view=36.002°, |||||||
| System length=3.723 mm, F-number=2.459, Image height=2.087 mm |||||||
| Lens Element | Surface | Radius of curvature (mm) | Thickness (mm) | Index of refraction | Abbe number | Focal Length (mm) |
| Object | | Infinite | 10000 | | | |
| Aperture stop 2 | | Infinite | -0.141 | | | |
| First lens element 3 | Object-side surface 31 | 1.281 | 0.485 | 1.545 | 55.987 | 3.086 |
| | Image-side surface 32 | 4.616 | 0.051 | | | |
| Second lens element 4 | Object-side surface 41 | 3.076 | 0.190 | 1.661 | 20.401 | -6.239 |
| | Image-side surface 42 | 1.724 | 0.259 | | | |
| Third lens element 5 | Object-side surface 51 | 4.097 | 0.417 | 1.545 | 55.987 | 13.308 |
| | Image-side surface 52 | 9.050 | 0.240 | | | |
| Fourth lens element 6 | Object-side surface 61 | -3.093 | 0.541 | 1.545 | 55.987 | 1.906 |
| | Image-side surface 62 | -0.827 | 0.069 | | | |
| Fifth lens element 7 | Object-side surface 71 | 5.627 | 0.392 | 1.535 | 55.690 | -1.766 |
| | Image-side surface 72 | 0.791 | 0.500 | | | |
| Filter 9 | Object-side surface 91 | Infinite | 0.210 | 1.517 | 64.167 | |
| | Image-side surface 92 | Infinite | 0.369 | | | |
| | Image plane 100 | Infinite | | | | |

FIG.28

| Surface | K | $a_2$ | $a_4$ | $a_6$ | $a_8$ |
|---|---|---|---|---|---|
| 31 | -2.511234E-02 | 0.000000E+00 | 2.863228E-02 | 1.836034E-02 | -2.433662E-01 |
| 32 | 0.000000E+00 | 0.000000E+00 | -2.754047E-01 | 4.752628E-01 | -8.513135E-01 |
| 41 | 0.000000E+00 | 0.000000E+00 | -4.049201E-01 | 5.592973E-01 | -9.629725E-01 |
| 42 | 1.878854E+00 | 0.000000E+00 | -2.770632E-01 | 3.045152E-01 | -6.248722E-02 |
| 51 | 0.000000E+00 | 0.000000E+00 | -1.304328E-01 | -1.901238E-01 | 5.383367E-02 |
| 52 | 0.000000E+00 | 0.000000E+00 | -8.435946E-02 | -5.116381E-02 | -3.244083E-01 |
| 61 | 0.000000E+00 | 0.000000E+00 | 0.000000E+00 | 0.000000E+00 | 0.000000E+00 |
| 62 | -3.591816E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | -6.118865E+00 | 0.000000E+00 | 0.000000E+00 | 0.000000E+00 | 0.000000E+00 |

| Surface | $a_{10}$ | $a_{12}$ | $a_{14}$ | $a_{16}$ |
|---|---|---|---|---|
| 31 | 3.356345E-01 | 2.598774E-01 | 2.229095E-01 | -1.713613E+00 |
| 32 | 3.475702E-01 | 2.852333E-01 | 1.582121E+00 | 1.416170E+00 |
| 41 | 7.977581E-01 | 7.149490E-01 | 9.762235E-02 | 1.721374E+00 |
| 42 | -2.377507E-01 | -3.720503E-01 | 2.142026E+00 | -4.800090E-01 |
| 51 | 6.500095E-01 | -1.987448E+00 | 1.175004E+00 | 1.102259E+00 |
| 52 | 2.286376E-01 | 1.368787E-01 | -1.205317E+00 | 1.120857E+00 |
| 61 | 0.000000E+00 | 0.000000E+00 | 0.000000E+00 | 0.000000E+00 |
| 62 | 0.000000E+00 | 0.000000E+00 | 0.000000E+00 | 0.000000E+00 |
| 71 | 0.000000E+00 | 0.000000E+00 | 0.000000E+00 | 0.000000E+00 |
| 72 | 0.000000E+00 | 0.000000E+00 | 0.000000E+00 | 0.000000E+00 |

FIG.29

| Seventh embodiment ||||||
|---|---|---|---|---|---|
| Effective focal length=2.799 mm, Half field of view=37.496°, ||||||
| System length=3.401 mm, F-number=2.653, Image height=2.345 mm ||||||
| Lens Element | Surface | Radius of curvature (mm) | Thickness (mm) | Index of refraction | Abbe number | Focal Length (mm) |
| Object | | Infinite | 10000 | | | |
| Aperture stop 2 | | Infinite | -0.113 | | | |
| First lens element 3 | Object-side surface 31 | 1.198 | 0.498 | 1.545 | 55.987 | 2.857 |
| | Image-side surface 32 | 4.391 | 0.050 | | | |
| Second lens element 4 | Object-side surface 41 | 2.966 | 0.216 | 1.661 | 20.401 | -6.652 |
| | Image-side surface 42 | 1.725 | 0.239 | | | |
| Third lens element 5 | Object-side surface 51 | 2.576 | 0.319 | 1.545 | 55.987 | 11.097 |
| | Image-side surface 52 | 4.283 | 0.260 | | | |
| Fourth lens element 6 | Object-side surface 61 | -1.577 | 0.280 | 1.545 | 55.987 | 2.412 |
| | Image-side surface 62 | -0.763 | 0.050 | | | |
| Fifth lens element 7 | Object-side surface 71 | 9.141 | 0.544 | 1.535 | 55.690 | -2.107 |
| | Image-side surface 72 | 0.985 | 0.500 | | | |
| Filter 9 | Object-side surface 91 | Infinite | 0.210 | 1.517 | 64.167 | |
| | Image-side surface 92 | Infinite | 0.235 | | | |
| | Image plane 100 | Infinite | | | | |

FIG.32

| Surface | K | $a_2$ | $a_4$ | $a_6$ | $a_8$ |
|---|---|---|---|---|---|
| 31 | -1.621616E-01 | 0.000000E+00 | 1.649094E-02 | 5.707006E-02 | -2.430608E-01 |
| 32 | 0.000000E+00 | 0.000000E+00 | -2.900275E-01 | 2.814385E-01 | -5.278302E-01 |
| 41 | 0.000000E+00 | 0.000000E+00 | -4.748781E-01 | 5.575873E-01 | -9.540703E-01 |
| 42 | 2.176489E+00 | 0.000000E+00 | -2.897622E-01 | 3.575423E-01 | -1.592821E-01 |
| 51 | 0.000000E+00 | 0.000000E+00 | -1.560512E-01 | 6.127808E-02 | -4.547502E-02 |
| 52 | 0.000000E+00 | 0.000000E+00 | -7.413168E-02 | -9.435329E-02 | -1.692669E-01 |
| 61 | 0.000000E+00 | 0.000000E+00 | 0.000000E+00 | 0.000000E+00 | 0.000000E+00 |
| 62 | -2.965247E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | -8.142503E+00 | 0.000000E+00 | 0.000000E+00 | 0.000000E+00 | 0.000000E+00 |

| Surface | $a_{10}$ | $a_{12}$ | $a_{14}$ | $a_{16}$ | |
|---|---|---|---|---|---|
| 31 | 2.098745E-01 | 3.489283E-01 | 1.310601E+00 | -4.139959E+00 | |
| 32 | 9.289258E-01 | -2.248297E-02 | -1.230847E-01 | 8.861596E+00 | |
| 41 | 1.114954E+00 | 1.894505E+00 | 1.963539E+00 | -1.456078E+00 | |
| 42 | -3.027721E-01 | -8.628409E-02 | 2.928208E+00 | -6.715793E-01 | |
| 51 | 5.745921E-01 | -1.772997E+00 | 1.294203E+00 | -1.322218E-01 | |
| 52 | 3.250264E-01 | 9.680832E-02 | -1.297116E+00 | 1.106744E+00 | |
| 61 | 0.000000E+00 | 0.000000E+00 | 0.000000E+00 | 0.000000E+00 | |
| 62 | 0.000000E+00 | 0.000000E+00 | 0.000000E+00 | 0.000000E+00 | |
| 71 | 0.000000E+00 | 0.000000E+00 | 0.000000E+00 | 0.000000E+00 | |
| 72 | 0.000000E+00 | 0.000000E+00 | 0.000000E+00 | 0.000000E+00 | |

FIG.33

| Embodiment | 1 | 2 | 3 | 4 | 5 | 6 | 7 |
|---|---|---|---|---|---|---|---|
| T1 | 0.498 | 0.312 | 0.478 | 0.532 | 0.469 | 0.485 | 0.498 |
| G1 | 0.065 | 0.063 | 0.050 | 0.052 | 0.046 | 0.051 | 0.050 |
| T2 | 0.239 | 0.202 | 0.246 | 0.222 | 0.206 | 0.190 | 0.216 |
| G2 | 0.149 | 0.126 | 0.194 | 0.139 | 0.227 | 0.259 | 0.239 |
| T3 | 0.419 | 0.302 | 0.582 | 0.409 | 0.386 | 0.417 | 0.319 |
| G3 | 0.189 | 0.226 | 0.171 | 0.149 | 0.245 | 0.240 | 0.260 |
| T4 | 0.407 | 0.280 | 0.250 | 0.457 | 0.418 | 0.541 | 0.280 |
| G4 | 0.067 | 0.078 | 0.068 | 0.063 | 0.046 | 0.069 | 0.050 |
| T5 | 0.413 | 0.431 | 0.327 | 0.408 | 0.405 | 0.392 | 0.544 |
| G5 | 0.500 | 0.500 | 0.500 | 0.500 | 0.500 | 0.500 | 0.500 |
| TF | 0.210 | 0.210 | 0.210 | 0.210 | 0.210 | 0.210 | 0.210 |
| GFP | 0.231 | 0.067 | 0.449 | 0.287 | 0.279 | 0.369 | 0.235 |
| TL | 2.446 | 2.020 | 2.365 | 2.430 | 2.450 | 2.643 | 2.457 |
| ALT | 1.975 | 1.527 | 1.883 | 2.027 | 1.885 | 2.025 | 1.857 |
| AAG | 0.470 | 0.493 | 0.482 | 0.403 | 0.565 | 0.618 | 0.599 |
| TTL | 3.386 | 2.797 | 3.524 | 3.427 | 3.439 | 3.723 | 3.401 |
| BFL | 0.941 | 0.777 | 1.159 | 0.997 | 0.989 | 1.079 | 0.945 |
| EFL | 2.873 | 2.020 | 2.838 | 2.676 | 2.727 | 3.169 | 2.799 |
| ALT/AAG | 4.200 | 3.100 | 3.909 | 5.031 | 3.336 | 3.275 | 3.100 |
| ALT/BFL | 2.100 | 1.966 | 1.625 | 2.032 | 1.905 | 1.876 | 1.966 |
| EFL/TL | 1.175 | 1.000 | 1.200 | 1.101 | 1.113 | 1.199 | 1.139 |
| (T1+T4+T5)/(T3+T4) | 1.594 | 1.758 | 1.267 | 1.614 | 1.606 | 1.480 | 2.207 |
| BFL/(T1+T2) | 1.277 | 1.510 | 1.600 | 1.323 | 1.465 | 1.600 | 1.323 |
| EFL/(G1+G4) | 21.722 | 14.349 | 24.138 | 23.247 | 29.437 | 26.533 | 27.994 |
| AAG/(G2+G3) | 1.391 | 1.400 | 1.323 | 1.400 | 1.196 | 1.239 | 1.200 |
| TTL/TL | 1.385 | 1.385 | 1.490 | 1.410 | 1.404 | 1.408 | 1.385 |
| TTL/(T3+T4) | 4.100 | 4.806 | 4.234 | 3.961 | 4.274 | 3.884 | 5.676 |
| TL/BFL | 2.600 | 2.600 | 2.041 | 2.437 | 2.476 | 2.449 | 2.600 |
| (T1+T4+T5)/BFL | 1.400 | 1.317 | 0.910 | 1.400 | 1.306 | 1.314 | 1.400 |
| ALT/(T1+T2) | 2.682 | 2.968 | 2.600 | 2.688 | 2.792 | 3.002 | 2.601 |
| AAG/(G1+G4) | 3.556 | 3.500 | 4.097 | 3.500 | 6.100 | 5.177 | 5.993 |
| EFL/(T1+T2) | 3.900 | 3.925 | 3.918 | 3.549 | 4.039 | 4.698 | 3.920 |
| (G2+G3)/(G1+G4) | 2.556 | 2.500 | 3.097 | 2.500 | 5.100 | 4.177 | 4.993 |
| TTL/BFL | 3.600 | 3.600 | 3.041 | 3.437 | 3.476 | 3.449 | 3.600 |
| TL/(T3+T4) | 2.961 | 3.471 | 2.842 | 2.808 | 3.045 | 2.758 | 4.100 |

FIG.34

OPTICAL LENS ASSEMBLY

CROSS-REFERENCE TO RELATED APPLICATION

This application claims the priority benefit of Chinese application serial no. 201710059290.0, filed on Jan. 24, 2017. The entirety of the above-mentioned patent application is hereby incorporated by reference herein and made a part of this specification.

BACKGROUND OF THE INVENTION

Field of the Invention

The invention relates to an optical lens, and particularly relates to an optical lens assembly.

Description of Related Art

In recent years, as use of portable electronic devices (e.g., mobile phones and digital cameras, etc.) becomes ubiquitous, techniques related to image modules have also been developed significantly, wherein the image module mainly includes an optical lens assembly, a module holder unit and a sensor, etc., and the demand for minimized image module increases due to a thinning and lightweight trend of mobile phones and digital cameras. As dimensions of a charged coupled device (CCD) and complementary metal-oxide semiconductor (CMOS) are reduced and significant progress is made in related technology, the length of the optical lens assembly in the image module is also required to be correspondingly reduced. However, in order to avoid decline of image capturing effect and image capturing quality, good optical performance should also be achieved while the total length of the optical lens assembly is shortened. The most important characteristics of the optical imaging lens are imaging quality and a volume thereof.

Specifications of portable electronic products change rapidly, and the optical lens assemblies serving as key components are also developed in diversified ways. Applications of the optical lens sets not only include image capturing and video recording, but also include environment monitoring, driving data recording, etc., and along with progress of image sensing technology, consumers have higher demand on imaging quality. Therefore, the design of the optical lens assemblies not only requires achieving good imaging quality and a smaller lens space, but also has to be considered improvement of field of view and the size of an aperture due to a dynamic and light inadequate environment.

However, regarding the design of the optical lens assemblies, in order to fabricate the optical lens assemblies with both characteristics of good imaging quality and miniaturization, it is not enough to purely scale down the lenses with good imaging quality, and a material property is also involved, and practical problems in production such as an assembling yield, etc., are also considered.

A technical difficulty for fabricating the miniaturized lens is obviously higher than that of the conventional lens, so that it is still a target of the industry, government and academia to produce the optical lens assembly complied with demands of consumer electronics and to keep improving the imaging quality thereof.

SUMMARY OF THE INVENTION

The invention provides an optical lens assembly having good optical performance while the length of lens system is reduced.

An embodiment of the invention provides an optical lens assembly including a first lens element, a second lens element, a third lens element, a fourth lens element, and a fifth lens element arranged in a sequence from an object side to an image side along an optical axis. Each of the first lens element to the fifth lens element includes an object-side surface that faces the object side and allows imaging rays to pass through as well as an image-side surface that faces the image side and allows the imaging rays to pass through. The image-side surface of the first lens element has a concave portion in a vicinity of a periphery of the first lens element. The second lens element has negative refracting power. The object-side surface of the second lens element has a convex portion in a vicinity of a periphery of the second lens element, and the image-side surface of the second lens element has a concave portion in a vicinity of the optical axis. The object-side surface of the third lens element has a concave portion in a vicinity of a periphery of the third lens element, and the image-side surface of the third lens element has a convex portion in the vicinity of the periphery of the third lens element. The fourth lens element has positive refracting power. The image-side surface of the fourth lens element has a convex portion in the vicinity of the optical axis. The object-side surface of the fifth lens element has a convex portion in the vicinity of the optical axis, and the image-side surface of the fifth lens element having a concave portion in the vicinity of the optical axis. Only the first lens element to the fifth lens element have refracting power. The optical lens assembly satisfies: $3.1 \leq ALT/AAG$, where ALT is a sum of thicknesses of the first lens element, the second lens element, the third lens element, the fourth lens element, and the fifth lens element on the optical axis, and AAG is a sum of four air gaps from the first lens element to the fifth lens element on the optical axis.

An embodiment of the invention provides an optical lens assembly including an aperture stop, a first lens element, a second lens element, a third lens element, a fourth lens element, and a fifth lens element arranged in a sequence from an object side to an image side along an optical axis. Each of the first lens element to the fifth lens element includes an object-side surface that faces the object side and allows imaging rays to pass through as well as an image-side surface that faces the image side and allows the imaging rays to pass through. The image-side surface of the first lens element has a concave portion in a vicinity of a periphery of the first lens element. The second lens element has negative refracting power. The object-side surface of the second lens element has a convex portion in a vicinity of a periphery of the second lens element, and the image-side surface of the second lens element has a concave portion in a vicinity of the optical axis. The third lens element has positive refracting power. The object-side surface of the third lens element has a concave portion in a vicinity of a periphery of the third lens element, and the image-side surface of the third lens element has a convex portion in the vicinity of the periphery of the third lens element. The fourth lens element has positive refracting power. The image-side surface of the fourth lens element has a convex portion in the vicinity of the optical axis. The object-side surface of the fifth lens element has a convex portion in the vicinity of the optical axis, and the image-side surface of the fifth lens element has a concave portion in the vicinity of the optical axis. Only the first lens element to the fifth lens element have refracting power. The optical lens assembly satisfies: $2.8 \leq ALT/AAG$, where ALT is a sum of thicknesses of the first lens element, the second lens element, the third lens element, the fourth lens element, and the fifth lens element on the optical axis, and AAG is a sum of four air gaps from the first lens element to the fifth lens element on the optical axis.

Based on the above, advantageous effects of the optical lens assembly according to the embodiments of the invention are as follows. With the concave and convex shape design and arrangement of the object-side surface or image-side surface of the lens elements, under the circumstances where the length of the lens system is reduced, the optical lens assembly maintains good optical performance sufficient to overcome aberration and provides good image quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram illustrating a surface shape structure of a lens.

FIG. 2 is a schematic diagram illustrating surface shape concave and convex structures and a light focal point.

FIG. 3 is a schematic diagram illustrating a surface shape structure of a lens of a first example.

FIG. 4 is a schematic diagram illustrating a surface shape structure of a lens of a second example.

FIG. 5 is a schematic diagram illustrating a surface shape structure of a lens of a third example.

FIG. 8 shows detailed optical data pertaining to the optical lens assembly according to the first embodiment of the invention.

FIG. 9 shows aspheric parameters pertaining to the optical lens assembly according to the first embodiment of the invention.

FIG. 12 shows detailed optical data pertaining to the optical lens assembly according to the second embodiment of the invention.

FIG. 13 shows aspheric parameters pertaining to the optical lens assembly according to the second embodiment of the invention.

FIG. 16 shows detailed optical data pertaining to the optical lens assembly according to the third embodiment of the invention.

FIG. 17 shows aspheric parameters pertaining to the optical lens assembly according to the third embodiment of the invention.

FIG. 20 shows detailed optical data pertaining to the optical lens assembly according to the fourth embodiment of the invention.

FIG. 21 shows aspheric parameters pertaining to the optical lens assembly according to the fourth embodiment of the invention.

FIG. 24 shows detailed optical data pertaining to the optical lens assembly according to the fifth embodiment of the invention.

FIG. 25 shows aspheric parameters pertaining to the optical lens assembly according to the fifth embodiment of the invention.

FIG. 28 shows detailed optical data pertaining to the optical lens assembly according to the sixth embodiment of the invention.

FIG. 29 shows aspheric parameters pertaining to the optical lens assembly according to the sixth embodiment of the invention.

FIG. 32 shows detailed optical data pertaining to the optical lens assembly according to the seventh embodiment of the invention.

FIG. 33 shows aspheric parameters pertaining to the optical lens assembly according to the seventh embodiment of the invention.

FIG. 34 is a table diagram of various important parameters and expressions of the optical imaging lenses of the first through the seventh embodiments of the invention.

DESCRIPTION OF THE EMBODIMENTS

Figure 6:
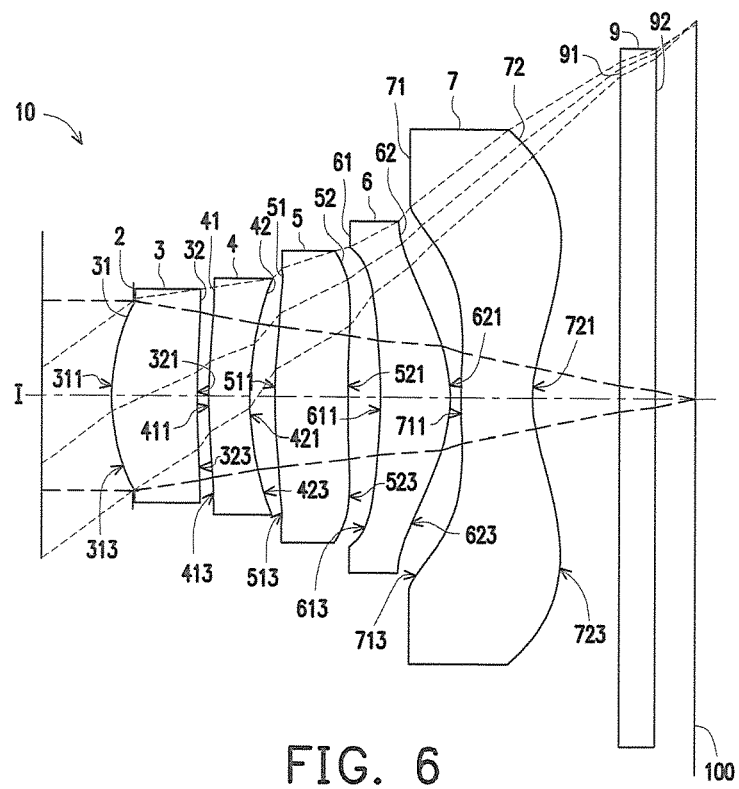
FIG. 6 is a schematic diagram illustrating an optical lens assembly according to a first embodiment of the invention.

In the present specification, the description "a lens element having positive refracting power (or negative refracting power)" means that the paraxial refracting power of the lens element in Gaussian optics is positive (or negative). The description "an object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic diagram illustrating an optical lens assembly according to a first embodiment of the invention, and FIGS. 7A to 7D are diagrams illustrating a longitudinal spherical aberration and various aberrations of the optical lens assembly according to the first embodiment of the invention. Referring to FIG. 6, an optical lens assembly 10 in a first embodiment of the invention includes an aperture stop 2, a first lens element 3, a second lens element 4, a third lens element 5, a fourth lens element 6, a fifth lens element 7, and a filter 9 arranged in a sequence from an object side to an image side along an optical axis I of the optical lens assembly 10. When a ray emitted from an object to be captured enters the optical lens assembly 10, the ray passes through the aperture stop 2, the first lens element 3, the second lens element 4, the third lens element 5, the fourth lens element 6, the fifth lens element 7, and the filter 9, so as to form an image on an image plane 100. The filter 9 is, for example, an infrared cut filter (IR cut filter) configured for preventing an IR ray in a part of the IR band in the ray from being transmitted to the image plane 100 and affecting the image quality. It should be noted that the object side is a side facing the object to be captured, and the image side is a side facing the image plane 100.

The first lens element 3, the second lens element 4, the third lens element 5, the fourth lens element 6, the fifth lens element 7, and the filter 9 respectively have object-side surfaces 31, 41, 51, 61, 71, and 91 facing the object side and allowing imaging rays to pass through as well as image-side surfaces 32, 42, 52, 62, 72, and 92 facing the image side and allowing the imaging rays to pass through.

In addition, in order to meet the product demand of lightweight, the first lens element 3 through the fifth lens element 7 all have refracting power and are all formed of plastic materials; however, the invention is not intended to limit the materials of the first lens element 3 through the fifth lens element 7.

The first lens element 3 has positive refracting power. The object-side surface 31 of the first lens element 3 has a convex portion 311 in a vicinity of the optical axis and a convex portion 313 in a vicinity of a periphery of the first lens element 3. The image-side surface 32 of the first lens element 3 has a concave portion 321 in the vicinity of the optical axis and a concave portion 323 in the vicinity of the periphery of the first lens element 3.

The second lens element 4 has negative refracting power. The object-side surface 41 of the second lens element 4 has a convex portion 411 in the vicinity of the optical axis and a convex portion 413 in a vicinity of a periphery of the second lens element 4. The image-side surface 42 of the second lens element 4 has a concave portion 421 in the vicinity of the optical axis and a concave portion 423 in the vicinity of the periphery of the second lens element 4.

The third lens element 5 has positive refracting power. The object-side surface 51 of the third lens element 5 has a convex portion 511 in the vicinity of the optical axis and a concave portion 513 in a vicinity of a periphery of the third lens element 5. The image-side surface 52 of the third lens element 5 has a concave portion 521 in the vicinity of the optical axis and a convex portion 523 in the vicinity of the periphery of the third lens element 5.

The fourth lens element 6 has positive refracting power. The object-side surface 61 of the fourth lens element 6 has a concave portion 611 in the vicinity of the optical axis and a concave portion 613 in a vicinity of a periphery of the fourth lens element 6. The image-side surface 62 of the fourth lens element 6 has a convex portion 621 in the vicinity of the optical axis and a concave portion 623 in the vicinity of the periphery of the fourth lens element 6.

The fifth lens element 7 has negative refracting power. The object-side surface 71 of the fifth lens element 7 has a convex portion 711 in the vicinity of the optical axis and a concave portion 713 in a vicinity of a periphery of the fifth lens element 7. The image-side surface 72 of the fifth lens element 7 has a concave portion 721 in the vicinity of the optical axis and a convex portion 723 in the vicinity of the periphery of the fifth lens element 7.

In the first embodiment, only the lens elements described above (the first lens element 3 to the fifth lens element 7) have refracting power, and the number of lens elements that have refracting power is only five. In other words, in the first embodiment, the fourth lens element 6 is the second to the last lens element in the sequence, and the fifth lens element 7 is the last lens element in the sequence.

The detailed optical data in the first embodiment is described in FIG. 8, wherein the thickness of the aperture stop 2 being negative means that the object-side surface 32 of the first lens element 3 on the optical axis I is closer to the Object than the aperture stop 2. In the first embodiment, an effective focal length (EFL) of the total system is 2.873 mm, a half field of view (HFOV) thereof is 37.002°, a system length (TTL) thereof is 3.386 mm, an f-number (F/#) thereof is 2.441, and an image height thereof is 2.191 mm. The system length refers to a distance from the object-side surface 31 of the first lens element 3 to the image plane 100 on the optical axis I.

In the embodiment, a total of ten surfaces, namely the object-side surfaces 31, 41, 51, 61, 71 and the image-side surfaces 32, 42, 52, 62, 72 of the first lens element 3, the second lens element 4, the third lens element 5, the fourth lens element 6, and the fifth lens element 7 are aspheric surfaces. The aspheric surfaces are defined by the following formula.

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

Wherein,

Y is a distance from a point on an aspheric curve to the optical axis I;

Z is a depth of the aspheric surface (i.e. a perpendicular distance between the point on the aspheric surface that is spaced by the distance Y from the optical axis I and a tangent plane tangent to a vertex of the aspheric surface on the optical axis I.)

R is a radius of curvature of the surface of the lens element close to the optical axis I;

K is conic constant; and $a_i$ is $i^{th}$ aspheric coefficient.

The aspheric coefficients of the object-side surface 31 of the first lens element 3 through the image-side surface 72 of the fifth lens element 7 in the equation (1) are shown in FIG. 9. In detail, the column reference number 31 in FIG. 9 represents the aspheric coefficient of the object-side surface 31 of the first lens element 3 and so forth.

In addition, the relations among parameters pertaining to the optical lens assembly 10 in the first embodiment are shown in FIG. 34.

Wherein,

T1 is the thickness of the first lens element 3 on the optical axis I;

G1 is the air gap from the first lens element 3 to the second lens element 4 on the optical axis I, i.e. a distance from the image-side surface 32 of the first lens element 3 to the object-side surface 41 of the second lens element 4 on the optical axis I;

T2 is the thickness of the second lens element 4 on the optical axis I;

G2 is the air gap from the second lens element 4 to the third lens element 5 on the optical axis I, i.e. a distance from the image-side surface 42 of the second lens element 4 to the object-side surface 51 of the third lens element 5 on the optical axis I;

T3 is s the thickness of the third lens element 5 on the optical axis I;

G3 is the air gap from the third lens element 5 to the fourth lens element 6 on the optical axis I, i.e. a distance from the image-side surface 52 of the third lens element 5 to the object-side surface 61 of the fourth lens element 6 on the optical axis I;

T4 is the thickness of the fourth lens element 6 on the optical axis I;

G4 is the air gap from the fourth lens element 6 to the fifth lens element 7 on the optical axis I, i.e. a distance from the image-side surface 62 of the fourth lens element 6 to the object-side surface 71 of the fifth lens element 7 on the optical axis I;

T5 is the thickness of the fifth lens element 7 on the optical axis I;

G5 is the air gap from the fifth lens element 7 to the filter 9 on the optical axis I, i.e. a distance from the image-side surface 72 of the fifth lens element 7 to the object-side surface 91 of the filter 9 on the optical axis I;

TF is the thickness of the filter 9 on the optical axis I;

GFP is a distance from the filter 9 to the image plane 100 on the optical axis I, i.e. a distance from the image-side surface 92 of the filter 9 to the image plane 100 on the optical axis I;

TL is a distance from the object-side surface 31 of the third lens element 3 to the image-side surface 72 of the fifth lens element 7 on the optical axis I;

ALT is a sum of the thicknesses of the first lens element 3, the second lens element 4, the third lens element 5, the fourth lens element 6, and the fifth lens element 7 on the optical axis I, i.e., a sum of T1, T2, T3, T4, and T5;

AAG is a sum of four air gaps from the first lens element 3 to the fifth lens element 7 on the optical axis I, i.e. a sum of G1, G2, G3, and G4;

TTL is a distance from the object-side surface 31 of the first lens element 3 to the image plane 100 on the optical axis I;

BFL is a distance from the image-side surface 72 of the fifth lens element 7 to the image plane 100 on the optical axis I; and EFL is an effective focal length of the optical lens assembly 10.

In addition, it is further defined that:

f1 is a focal length of the first lens element 3;
f2 is a focal length of the second lens element 4;
f3 is a focal length of the third lens element 5;
f4 is a focal length of the fourth lens element 6;
f5 is a focal length of the fifth lens element 7;
n1 is a refractive index of the first lens element 3;
n2 is a refractive index of the second lens element 4;
n3 is a refractive index of the third lens element 5;
n4 is a refractive index of the fourth lens element 6;
n5 is a refractive index of the fifth lens element 7;
$\upsilon 1$ is an Abbe number, which may also be called a dispersion coefficient, of the first lens element 3;
$\upsilon 2$ is an Abbe number of the second lens element 4;
$\upsilon 3$ is an Abbe number of the third lens element 5;
$\upsilon 4$ is an Abbe number of the fourth lens element 6; and
$\upsilon 5$ is an Abbe number of the fifth lens element 7.

Figures 7A, 7B, 7C, 7D:
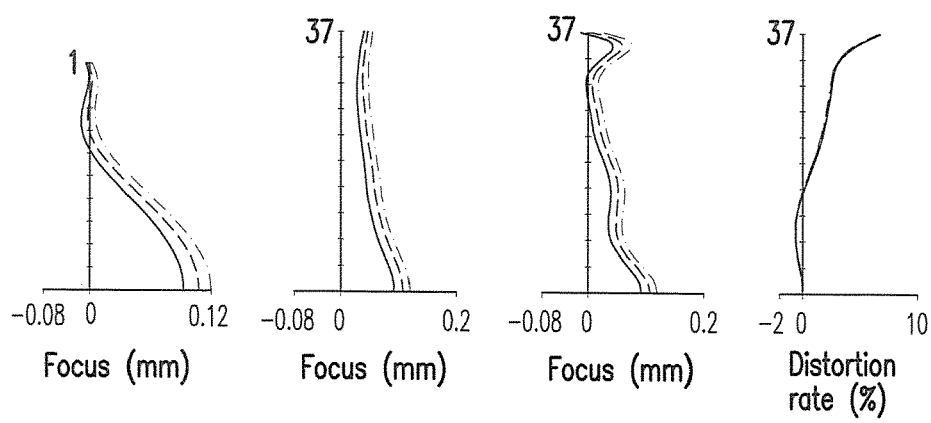
FIGS. 7A to 7D are diagrams illustrating a longitudinal spherical aberration and various aberrations of the optical lens assembly according to the first embodiment.

Referring to FIGS. 7A to 7D. The diagrams of FIG. 7A illustrates a longitudinal spherical aberration of the first embodiment when a pupil radius is 0.5525 mm. In the diagram shown in FIG. 7A which illustrates the longitudinal spherical aberration, curves formed by each wavelength are close to each other and are gathered in the middle, which represents that off-axis lights of different heights of each wavelength are gathered around imaging points, and according to a deviation of the curve of each wavelength, it is learned that deviations of the imaging points of the off-axis lights of different heights are controlled within a range of ±0.12 mm, so that the spherical aberration of the same wavelength is obviously ameliorated. Moreover, the distances between the three representative wavelengths are rather close, which represents that imaging positions of the lights with different wavelengths are rather close, so that a chromatic aberration is obviously ameliorated.

The diagrams of FIG. 7B and FIG. 7C respectively illustrates an astigmatism aberration in a sagittal direction and an astigmatism aberration in a tangential direction on the image plane 100 of the first embodiment. In FIGS. 7B and 7C which illustrate two diagrams of astigmatism aberration, the focal length variation of the three representative wavelengths in the entire field of view falls within ±0.12 mm, which represents that the optical system in the first embodiment can effectively eliminate aberration.

The diagram of FIG. 7D illustrates a distortion aberration on the image plane 100 in the first embodiment. In the diagram of the distortion aberration illustrated in FIG. 7D, the distortion aberration is maintained in a range of ±7%, which is in compliance with the image quality requirement of the optical system.

Based on the above, as compared to the existing optical lens, the first embodiment still maintains good image quality under a condition that the total length (i.e. system length) is reduced to about 3.386 mm.

Specifically, the image-side surface 32 of the first lens element 3 having a concave portion 323 in the vicinity of the periphery of the first lens element 3, the image-side surface 42 of the second lens element 4 having a concave portion 421 in the vicinity of the optical axis, and the image-side surface 72 of the fifth lens element 7 having a concave portion 721 in the vicinity of the optical axis are beneficial to converge light.

The image-side surface 62 of the fourth lens element 6 having a convex portion 621 in the vicinity of the optical axis and the object-side surface 71 of the fifth lens element 7 having a convex portion 711 in the vicinity of the optical axis may achieve the effect of correcting the overall aberration. The object-side surface 41 of the second lens element 4 having a convex portion 413 in the vicinity of the periphery of the second lens element 4, the object-side surface 51 of the third lens element 5 having a concave portion 513 in the vicinity of the periphery of the third lens element 5, and the image-side surface 52 of the third lens element 5 having a convex portion 523 in the vicinity of the periphery of the third lens element 5 may effectively correct the aberration of the local imaging of the object.

The second lens element 4 having negative refracting power is adapted to eliminate the aberration generated by the first lens element 3.

The fourth lens element 6 having positive refracting power is beneficial to a major correction of each of the aberrations.

Optionally, the design with the aperture stop 2 being aligned with the position of the object-side surface 32 of the first lens element 3 on the optical axis I may effectively shorten the system length, and the third lens element 5 having positive refracting power may achieve the effect of improving the image quality.

Through the co-operation of the above-mentioned designs, it is able to effectively shorten the system length, while ensuring image quality, and enhance the overall and local image clarities of the object.

In order to shorten the system length, the thicknesses of the lens elements and the air gaps between the lens elements are shortened. However, considering the ease of assembling and the quality of imaging, the thicknesses of the lens elements and the air gaps between the lens elements need to be designed appropriately. The optical lens assembly 10 can achieve a preferable configuration by satisfying at least one of the following conditional limitations:

3.1≤ALT/AAG, preferably 3.1≤ALT/AAG≤5.5, optimally 2.8≤ALT/AAG≤5.5;
ALT/BFL≤3, preferably 1.4≤ALT/BFL≤3;
(T1+T4+T5)/(T3+T4)≤2.4, preferably 1.2≤(T1+T4+T5)/(T3+T4)≤2.4;
BFL/(T1+T2)≤1.6, preferably 1.0≤BFL/(T1+T2)≤1.6;
AAG/(G2+G3)≤1.4, preferably 1.1≤AAG/(G2+G3)≤1.4;
(T1+T4+T5)/BFL≤1.4, preferably 0.9≤(T1+T4+T5)/BFL≤1.4;
ALT/(T1+T2)≤3.1, preferably 2.6≤ALT/(T1+T2)≤3.1;
AAG/(G1+G4)≤6.1, preferably 2.5≤AAG/(G1+G4)≤6.1; and
(G2+G3)/(G1+G4)≤5.2, preferably 1.5≤(G2+G3)/(G1+G4)≤5.2.

In order to maintain an appropriate ratio of the optical element parameters to the system length to avoid the parameters being too small to be detrimental to manufacturing or to avoid system length being too long due to parameters being too big, the optical lens assembly 10 may satisfies at least one of the following conditional limitations:

EFL/TL≤1.2, preferably 0.8≤EFL/TL≤1.2;
TTL/TL≤1.5, preferably 1.2≤TTL/TL≤1.5;
TTL/(T3+T4)≤6.5, preferably 3.5≤TTL/(T3+T4)≤6.5;
TL/BFL≤4.1, preferably 1.9≤TL/BFL≤4.1;
TTL/BFL≤3.6, preferably 2.9≤TTL/BFL≤3.6; and
TL/(T3+T4)≤4.8, preferably 2.5≤TL/(T3+T4)≤4.8.

The shortening of the EFL contributes to the enlargement of the field of view, so that the EFL is designed to be small. The field of view can be widened while thinning the thickness of the optical lens assembly when at least one of the following conditional limitations is satisfied:

EFL/(G1+G4)≤30, preferably 8.6≤EFL/(G1+G4)≤30;
EFL/(T1+T2)≤4.8, preferably 3.2≤EFL/(T1+T2)≤4.8; and
EFL/TL≤1.2, preferably 1.0≤EFL/TL≤1.2.

To those conditional limitations having the upper limit value, such as ALT/BFL≤3, (T1+T4+T5)/(T3+T4)≤2.4, BFL/(T1+T2)≤1.6, AAG/(G2+G3)≤1.4, (T1+T4+T5)/BFL≤1.4, ALT/(T1+T2)≤3.1, AAG/(G1+G4)≤6.1, (G2+G3)/(G1+G4)≤5.2, EFL/TL≤1.2, TTL/TL≤1.5, TTL/(T3+T4)≤6.5, TL/BFL≤4.1, TTL/BFL≤3.6, TL/(T3+T4)≤4.8, EFL/(G1+G4)≤30, EFL/(T1+T2)≤4.8, and EFL/TL≤1.2, when the denominator does not change, the numerator can be reduced to achieve the effect of reducing the volume of the optical lens assembly 10. An excellent image quality can be produced if at least one of the following conditional limitations is satisfied: 1.4≤ALT/BFL≤3, 1.2≤(T1+T4+T5)/(T3+T4)≤2.4, 1.0≤BFL/(T1+T2)≤1.6, 1.1≤AAG/(G2+G3)≤1.4, 0.9≤(T1+T4+T5)/BFL≤1.4, 2.6≤ALT/(T1+T2)≤3.1, 2.5≤AAG/(G1+G4)≤6.1, 1.5≤(G2+G3)/(G1+G4)≤5.2, 0.8≤EFL/TL≤1.2, 1.2≤TTL/TL≤1.5, 3.5≤TTL/(T3+T4)≤6.5, 1.9≤TL/BFL≤4.1, 2.9≤TTL/BFL≤3.6, 2.5≤TL/(T3+T4)≤4.8, 8.6≤EFL/(G1+G4)≤30, 3.2≤EFL/(T1+T2)≤4.8, and 1.0≤EFL/TL≤1.2.

If the optical lens assembly 10 can meet the conditional limitation having the lower limit value, such as 3.1≤ALT/AAG, the optical lens assembly 10 can have a better configuration and can maintain the appropriate yield under the premise of good image quality. The optical lens assembly 10 may further maintain a proper volume if the following conditional limitation is satisfied: 3.1≤ALT/AAG≤5.5, preferably 2.8≤ALT/AAG≤5.5.

Due to the unpredictability in the design of an optical system, with the framework of the embodiments of the invention, under the circumstances where the above-described conditions are satisfied, shorter system length, bigger aperture availability, wider field of view, improved image quality or better assembly yield rate can be preferably achieved so as to improve the shortcomings of conventional art.

The above-limited circumstances are provided in an exemplary sense and can be randomly and selectively combined and applied to the embodiments of the invention in different manners; however, the present invention should not be limited to the above examples. In implementation of the present invention, apart from the above-described relations, it is also possible to add additional detailed structure such as more concave and convex curvatures arrangements of a specific lens element so as to enhance control of system property and/or resolution. It should be noted that the above-described details can be optionally combined and applied to the other embodiments of the invention under the condition where they are not in conflict with one another.

Figure 10:
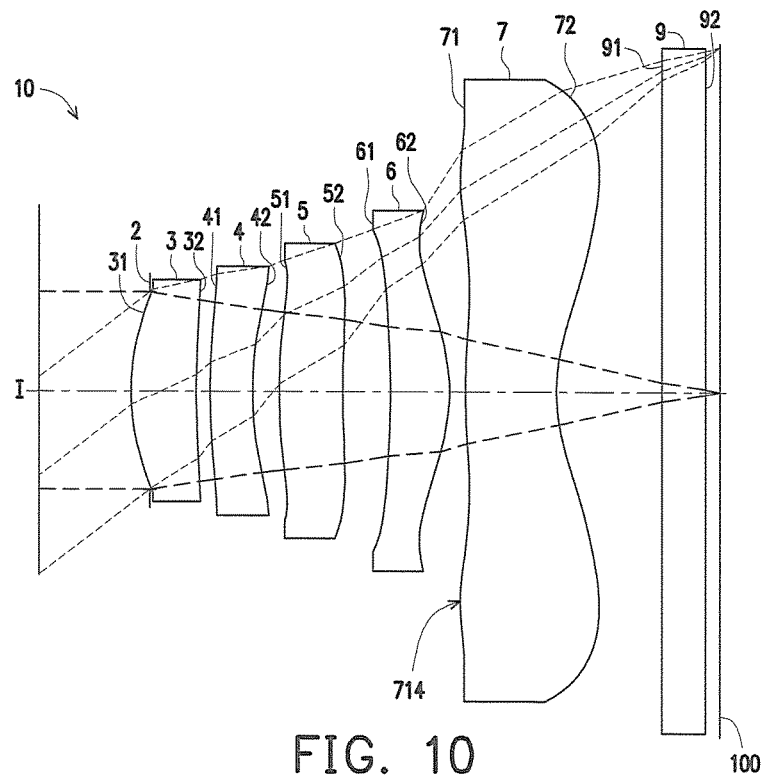
FIG. 10 is a schematic diagram illustrating an optical lens assembly according to a second embodiment of the invention.

FIG. 10 is a schematic diagram illustrating an optical lens assembly according to a second embodiment of the invention, and FIGS. 11A to 11D are diagrams illustrating a longitudinal spherical aberration and various aberrations of the optical lens assembly according to the second embodiment. Referring to FIG. 10, the second embodiment of the optical lens assembly 10 of the present invention is similar to the first embodiment. The main difference lies in optical data, aspheric coefficients and the parameters of the lens elements (the first, the second, the third, the fourth, and the fifth lens elements 3, 4, 5, 6, 7). Furthermore, the object-side surface 71 of the fifth lens element 7 has a convex portion 714 in the vicinity of the periphery of the fifth lens element 7.

The detailed optical data pertaining to the optical lens assembly 10 of the second embodiment is shown in FIG. 12, and the effective focal length (EFL) of the total system is 2.020 mm, the half field of view (HFOV) thereof is 37.500°, the system length (TTL) thereof is 2.797 mm, the f-number (F/#) thereof is 2.278, and the image height thereof is 1.633 mm.

FIG. 13 shows each of the aspheric coefficients used in the formula (1) for the object-side surface 31 of the first lens element 3 through the image-side surface 72 of the fifth lens element 7 in the second embodiment.

In addition, the relations among parameters pertaining to the optical lens assembly 10 in the second embodiment are shown in FIG. 34.

Figure 11A:
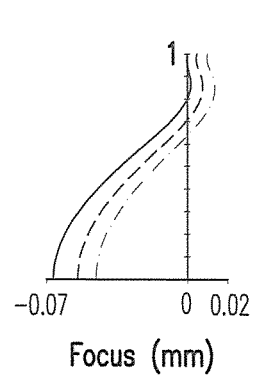
FIGS. 11A to 11D are diagrams illustrating a longitudinal spherical aberration and various aberrations of the optical lens assembly according to the second embodiment.
Figure 11B:
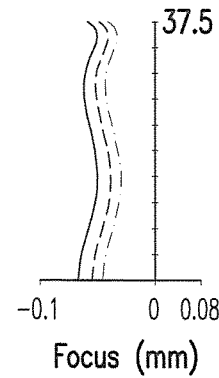
Figure 11C:
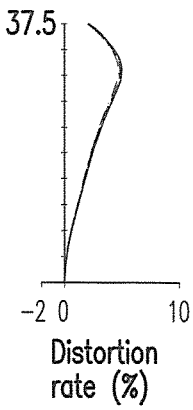
Figure 11D:
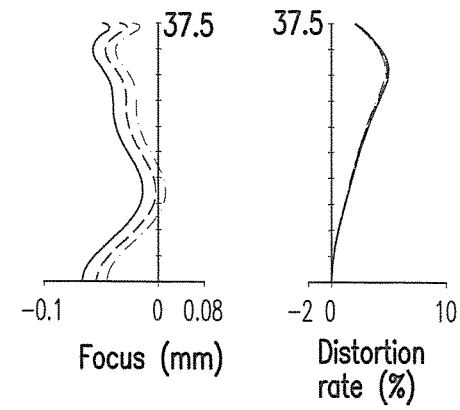

In the diagram shown in FIG. 11A which illustrates the longitudinal spherical aberration when the pupil radius is 0.4680 mm, a deviation of the imaging points of the off-axis rays of different heights is controlled within a range of ±0.07 mm. In the diagrams shown in FIG. 11B and FIG. 11C which illustrate two diagrams of the astigmatism aberration, a focal length variation of the three representative wavelengths in the whole field of view falls within ±0.07 mm. In the diagram of FIG. 11D which illustrates the distortion aberration, the distortion aberration is maintained within the range of ±5%. Therefore, as compared to the existing optical lens, the second embodiment still maintains good image quality under a condition that the system length is reduced to about 2.797 mm.

Based on the above, it can be obtained that the advantage of the second embodiment relative to the first embodiment lies in that wider HFOV, shorter TTL (system length), smaller F/# (larger aperture), less longitudinal spherical variation, astigmatism aberration, and distortion aberration may be achieved, and the optical lens assembly 10 of the second embodiment can be manufactured easier than the first embodiment, and therefore, a higher yield rate can be achieved.

Figure 14:
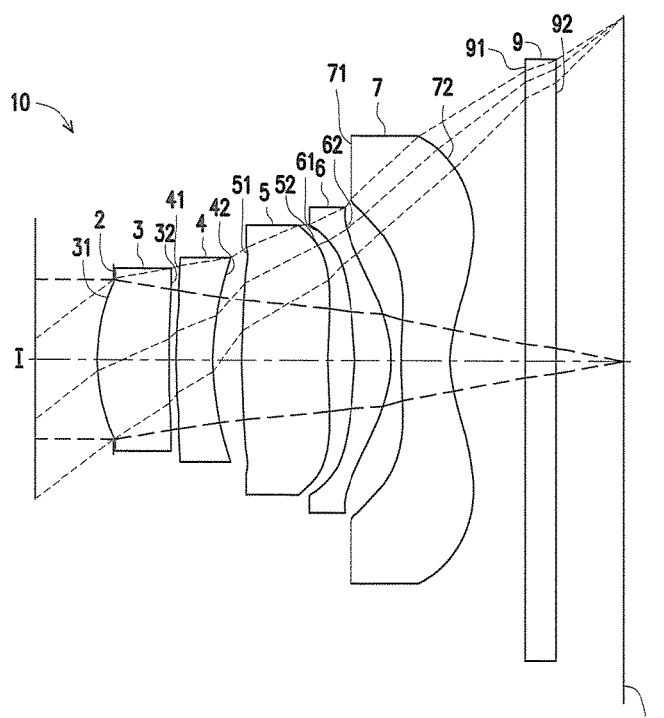
FIG. 14 is a schematic diagram illustrating an optical lens assembly according to a third embodiment of the invention.

FIG. 14 is a schematic diagram illustrating an optical lens assembly according to a third embodiment of the invention, and FIGS. 15A to 15D are diagrams illustrating a longitudinal spherical aberration and various aberrations of the optical lens assembly according to the third embodiment. Referring to FIG. 14, the third embodiment of the optical lens assembly 10 of the present invention is similar to the first embodiment. The main difference lies in optical data, aspheric coefficients and the parameters of the lens elements (the first, the second, the third, the fourth, and the fifth lens elements 3, 4, 5, 6, 7).

The detailed optical data pertaining to the optical lens assembly 10 of the third embodiment is shown in FIG. 16, and the effective focal length (EFL) of the total system is 2.838 mm, the half field of view (HFOV) thereof is 37.495°, the system length (TTL) thereof is 3.524 mm, the f-number (F/#) thereof is 2.643, and the image height thereof is 2.305 mm.

FIG. 17 shows each of the aspheric coefficients used in the formula (1) for the object-side surface 31 of the first lens element 3 through the image-side surface 72 of the fifth lens element 7 in the third embodiment.

In addition, the relations among parameters pertaining to the optical lens assembly 10 in the second embodiment are shown in FIG. 34.

Figures 15A, 15B, 15C, 15D:
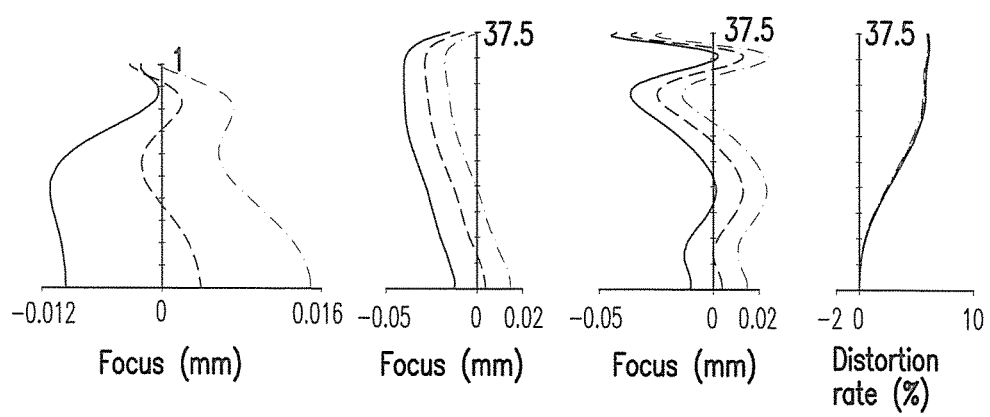
FIGS. 15A to 15D are diagrams illustrating a longitudinal spherical aberration and various aberrations of the optical lens assembly according to the third embodiment.

In the diagram shown in FIG. 15A which illustrates the longitudinal spherical aberration when the pupil radius is 0.5355 mm, a deviation of the imaging points of the off-axis rays of different heights is controlled within a range of ±0.016 mm. In the diagrams shown in FIG. 15B and FIG. 15C which illustrate two diagrams of the astigmatism aberration, a focal length variation of the three representative wavelengths in the whole field of view falls within ±0.045 mm. In the diagram of FIG. 15D which illustrates the distortion aberration, the distortion aberration is maintained within the range of ±6.5%.

Based on the above, it can be obtained that the advantage of the third embodiment relative to the first embodiment lies in that wider HFOV, less longitudinal spherical variation, astigmatism aberration, and distortion aberration may be achieved, and the optical lens assembly 10 of the third embodiment can be manufactured easier than the first embodiment, and therefore, a higher yield rate can be achieved.

Figure 18:
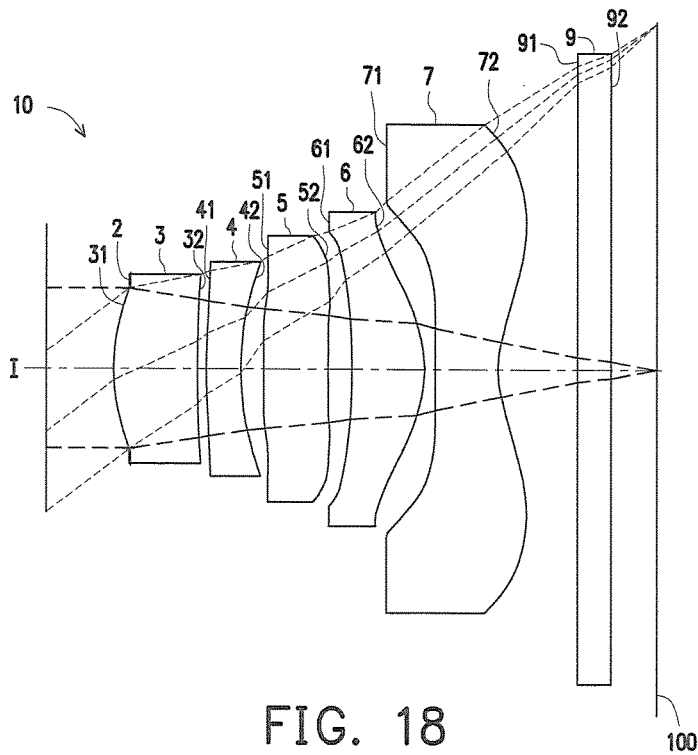
FIG. 18 is a schematic diagram illustrating an optical lens assembly according to a fourth embodiment of the invention.

FIG. 18 is a schematic diagram illustrating an optical lens assembly according to a fourth embodiment of the invention, and FIGS. 19A to 19D are diagrams illustrating a longitudinal spherical aberration and various aberrations of the optical lens assembly according to the fourth embodiment. Referring to FIG. 18, the fourth embodiment of the optical lens assembly 10 of the present invention is similar to the first embodiment. The main difference lies in optical data, aspheric coefficients and the parameters of the lens elements (the first, the second, the third, the fourth, and the fifth lens elements 3, 4, 5, 6, 7).

The detailed optical data pertaining to the optical lens assembly 10 of the fourth embodiment is shown in FIG. 20, and the effective focal length (EFL) of the total system is 3.427 mm, the half field of view (HFOV) thereof is 37.499°, the system length (TTL) thereof is 3.524 mm, the f-number (F/#) thereof is 2.623, and the image height thereof is 2.189 mm.

FIG. 21 shows each of the aspheric coefficients used in the formula (1) for the object-side surface 31 of the first lens element 3 through the image-side surface 72 of the fifth lens element 7 in the fourth embodiment.

In addition, the relations among parameters pertaining to the optical lens assembly 10 in the fourth embodiment are shown in FIG. 34.

Figures 19A, 19B, 19C, 19D:
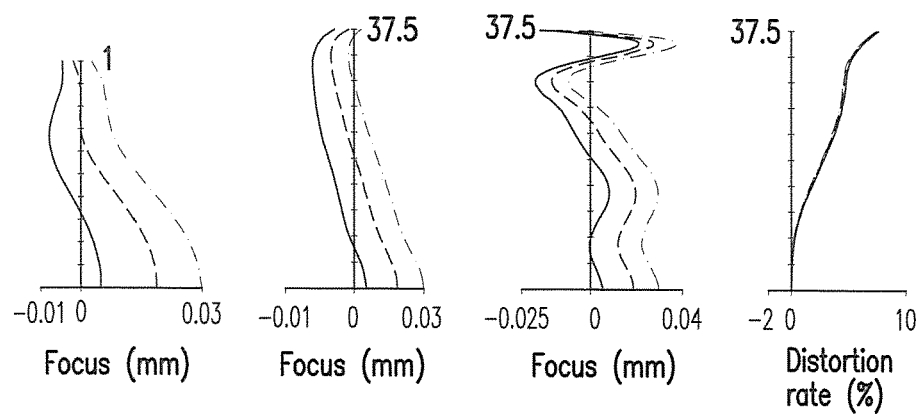
FIGS. 19A to 19D are diagrams illustrating a longitudinal spherical aberration and various aberrations of the optical lens assembly according to the fourth embodiment.

In the diagram shown in FIG. 19A which illustrates the longitudinal spherical aberration when the pupil radius is 0.5050 mm, a deviation of the imaging points of the off-axis rays of different heights is controlled within a range of ±0.03 mm. In the diagrams shown in FIG. 19B and FIG. 19C which illustrate two diagrams of astigmatism aberration, a focal length variation of the three representative wavelengths in the whole field of view falls within ±0.04 mm. In the diagram of FIG. 19D which illustrates the distortion aberration, the distortion aberration is maintained within the range of ±8%.

Based on the above, it can be obtained that the advantage of the fourth embodiment relative to the first embodiment lies in that wider HFOV, less longitudinal spherical variation and astigmatism aberration may be achieved, and the optical lens assembly 10 of the fourth embodiment can be manufactured easier than the first embodiment, and therefore, a higher yield rate can be achieved.

Figure 22:
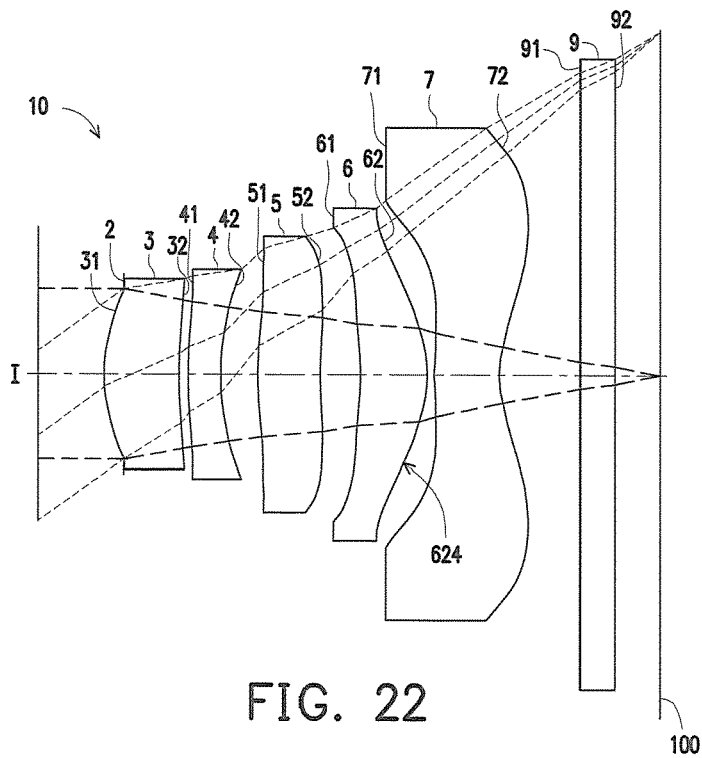
FIG. 22 is a schematic diagram illustrating an optical lens assembly according to a fifth embodiment of the invention.

FIG. 22 is a schematic diagram illustrating an optical lens assembly according to a fifth embodiment of the invention, and FIGS. 23A to 23D are diagrams illustrating a longitudinal spherical aberration and various aberrations of the optical lens assembly according to the fifth embodiment. Referring to FIG. 22, the fifth embodiment of the optical lens assembly 10 of the present invention is similar to the first embodiment. The main difference lies in optical data, aspheric coefficients and the parameters of the lens elements (the first, the second, the third, the fourth, and the fifth lens elements 3, 4, 5, 6, 7). Furthermore, the image-side surface 62 of the fourth lens element 6 has a convex portion 624 in the vicinity of the periphery of the fourth lens element 6.

The detailed optical data pertaining to the optical lens assembly 10 of the fifth embodiment is shown in FIG. 24, and the effective focal length (EFL) of the total system is 2.727 mm, the half field of view (HFOV) thereof is 36.001°, the system length (TTL) thereof is 3.439 mm, the f-number (F/#) thereof is 2.586, and the image height thereof is 2.130 mm.

FIG. 25 shows each of the aspheric coefficients used in the formula (1) for the object-side surface 31 of the first lens element 3 through the image-side surface 72 of the fifth lens element 7 in the fifth embodiment.

In addition, the relations among parameters pertaining to the optical lens assembly 10 in the fifth embodiment are shown in FIG. 34.

Figures 23A, 23B, 23C, 23D:
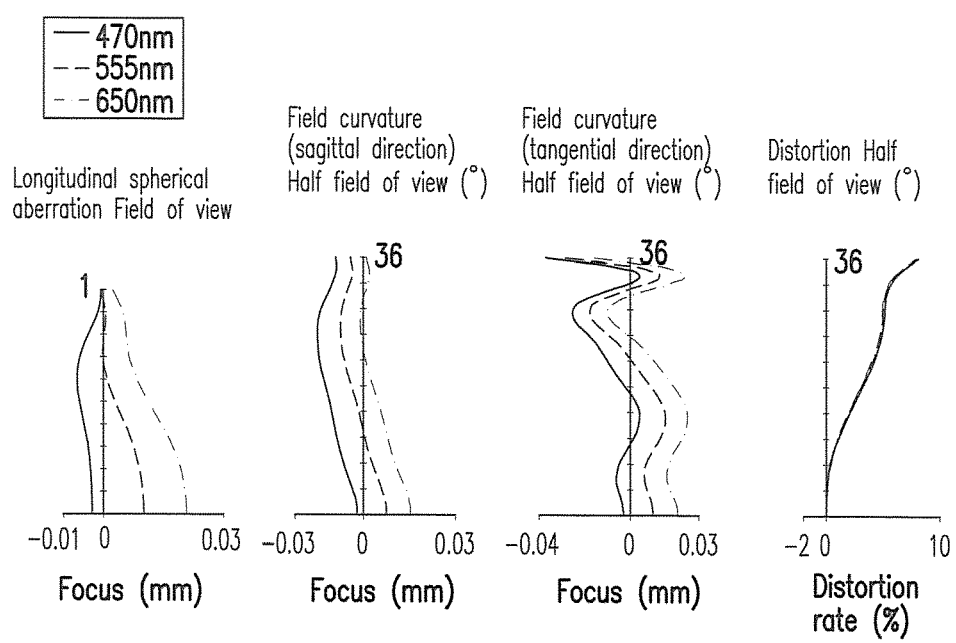
FIGS. 23A to 23D are diagrams illustrating a longitudinal spherical aberration and various aberrations of the optical lens assembly according to the fifth embodiment.

In the diagram shown in FIG. 23A which illustrates the longitudinal spherical aberration when the pupil radius is 0.5245 mm, a deviation of the imaging points of the off-axis rays of different heights is controlled within a range of ±0.023 mm. In the diagrams shown in FIG. 23B and FIG. 23C which illustrate two diagrams of the astigmatism aberration, a focal length variation of the three representative wavelengths in the whole field of view falls within ±0.04 mm. In the diagram of FIG. 23D which illustrates the distortion aberration, the distortion aberration is maintained within the range of ±8.5%.

Based on the above, it can be obtained that the advantage of the fifth embodiment relative to the first embodiment lies in that less longitudinal spherical variation and astigmatism aberration may be achieved, and the optical lens assembly 10 of the fifth embodiment can be manufactured easier than the first embodiment, and therefore, a higher yield rate can be achieved.

Figure 26:
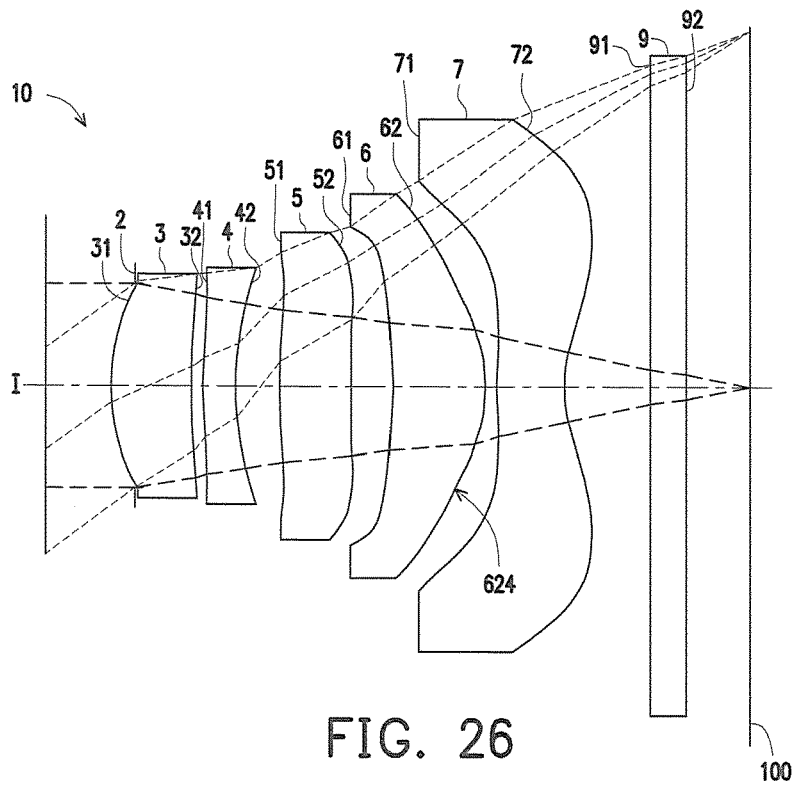
FIG. 26 is a schematic diagram illustrating an optical lens assembly according to a sixth embodiment of the invention.

FIG. 26 is a schematic diagram illustrating an optical lens assembly according to a sixth embodiment of the invention, and FIGS. 27A to 27D are diagrams illustrating a longitudinal spherical aberration and various aberrations of the optical lens assembly according to the sixth embodiment. Referring to FIG. 26, the sixth embodiment of the optical lens assembly 10 of the present invention is similar to the first embodiment. The main difference lies in the optical data, the aspheric coefficients and the parameters of the lens elements (the first, the second, the third, the fourth, and the fifth lens elements 3, 4, 5, 6, 7). Furthermore, the image-side surface 62 of the fourth lens element 6 has a convex portion 624 in the vicinity of the periphery of the fourth lens element 6.

The detailed optical data pertaining to the optical lens assembly 10 of the sixth embodiment is shown in FIG. 28, and the effective focal length (EFL) of the total system is 3.169 mm, the half field of view (HFOV) thereof is 36.002°, the system length (TTL) thereof is 3.723 mm, the f-number (F/#) thereof is 2.459, and the image height thereof is 2.087 mm.

FIG. 29 shows each of the aspheric coefficients used in the formula (1) for the object-side surface 31 of the first lens element 3 through the image-side surface 72 of the fifth lens element 7 in the sixth embodiment.

In addition, the relations among parameters pertaining to the optical lens assembly 10 in the sixth embodiment are shown in FIG. 34.

Figures 27A, 27B, 27C, 27D:
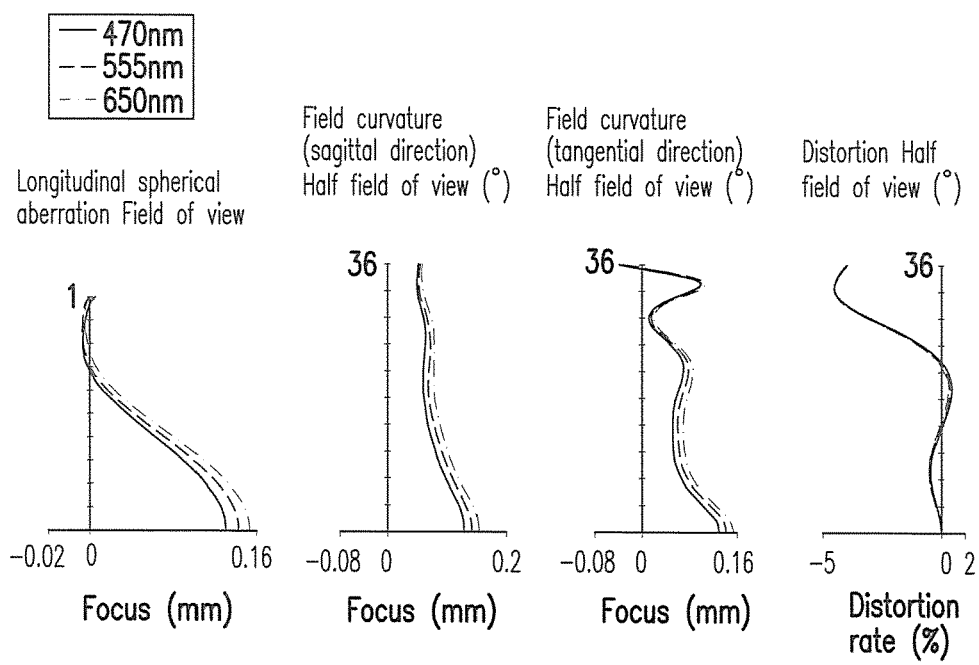
FIGS. 27A to 27D are diagrams illustrating a longitudinal spherical aberration and various aberrations of the optical lens assembly according to the sixth embodiment.

In the diagram shown in FIG. 27A which illustrates the longitudinal spherical aberration when the pupil radius is 0.5980 mm, a deviation of the imaging points of the off-axis rays of different heights is controlled within a range of ±0.16 mm. In the diagrams shown in FIG. 27B and FIG. 27C which illustrate two diagrams of the astigmatism aberration, a focal length variation of the three representative wavelengths in the whole field of view falls within ±0.16 mm. In the diagram of FIG. 27D which illustrates the distortion aberration, the distortion aberration is maintained within the range of 14.5%.

Based on the above, it can be obtained that the advantage of the sixth embodiment relative to the first embodiment lies in that less distortion aberration may be achieved, and the optical lens assembly 10 of the sixth embodiment can be manufactured easier than the first embodiment, and therefore, a higher yield rate can be achieved.

Figure 30:
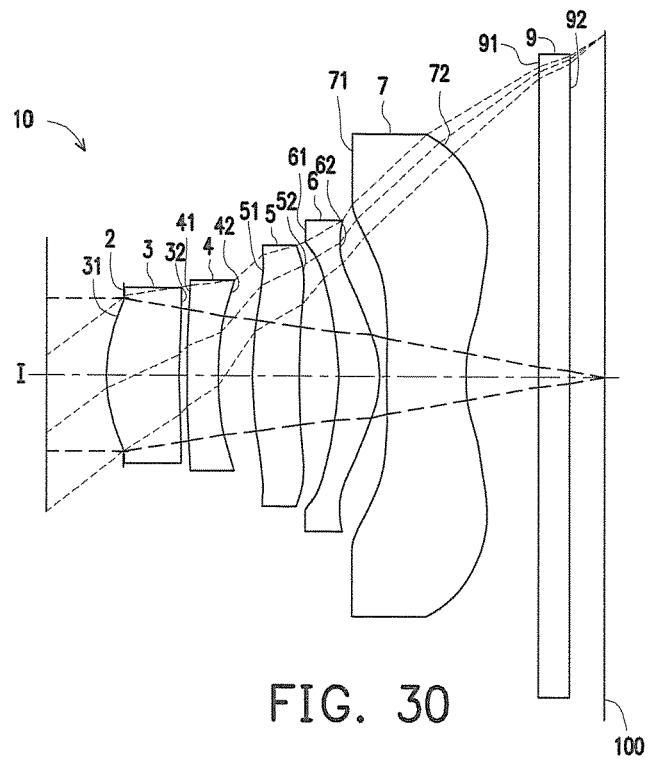
FIG. 30 is a schematic diagram illustrating an optical lens assembly according to a seventh embodiment of the invention.

FIG. 30 is a schematic diagram illustrating an optical lens assembly according to a seventh embodiment of the invention, and FIGS. 31A to 31D are diagrams illustrating a longitudinal spherical aberration and various aberrations of the optical lens assembly according to the seventh embodiment. Referring to FIG. 30, the seventh embodiment of the optical lens assembly 10 of the present invention is similar to the first embodiment. The main difference lies in optical data, aspheric coefficients and the parameters of the lens elements (the first, the second, the third, the fourth, and the fifth lens elements 3, 4, 5, 6, 7).

The detailed optical data pertaining to the optical lens assembly 10 of the seventh embodiment is shown in FIG. 32, and the effective focal length (EFL) of the total system is 2.799 mm, the half field of view (HFOV) thereof is 37.496°, the system length (TTL) thereof is 3.401 mm, the f-number (F/#) thereof is 2.653, and the image height thereof is 2.345 mm.

FIG. 33 shows each of the aspheric coefficients used in the formula (1) for the object-side surface 31 of the first lens element 3 through the image-side surface 72 of the fifth lens element 7 in the seventh embodiment.

In addition, the relations among parameters pertaining to the optical lens assembly 10 in the seventh embodiment are shown in FIG. 34.

Figures 31A, 31B, 31C, 31D:
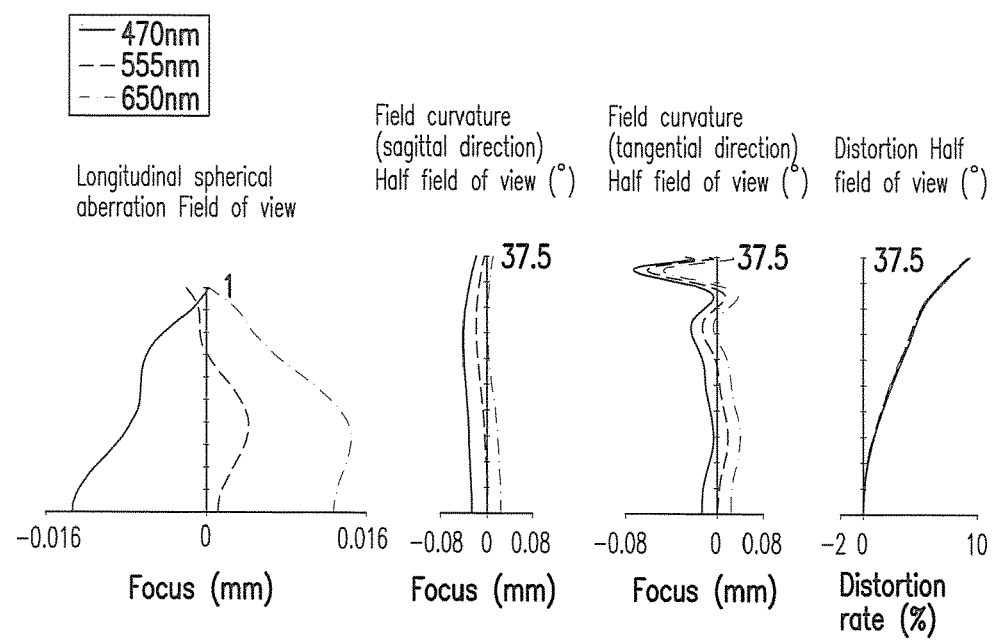
FIGS. 31A to 31D are diagrams illustrating a longitudinal spherical aberration and various aberrations of the optical lens assembly according to the seventh embodiment.

In the diagram shown in FIG. 31A which illustrates the longitudinal spherical aberration when the pupil radius is 0.5281 mm, a deviation of the imaging points of the off-axis rays of different heights is controlled within a range of ±0.015 mm. In the diagrams shown in FIG. 31B and FIG. 31C which illustrate two diagrams of the astigmatism aberration, a focal length variation of the three representative wavelengths in the whole field of view falls within ±0.08 mm. In the diagram of FIG. 31D which illustrates the distortion aberration, the distortion aberration is maintained within the range of ±9.5%.

Based on the above, it can be obtained that the advantage of the seventh embodiment relative to the first embodiment lies in that wider HFOV, less longitudinal spherical variation and astigmatism aberration may be achieved, and the optical lens assembly 10 of the seventh embodiment can be manufactured easier than the first embodiment, and therefore, a higher yield rate can be achieved.

In summary, the optical lens assembly in the embodiments of the invention may achieve the following effects and advantages.

1. The image-side surface of the first lens element having a concave portion in the vicinity of the periphery of the first lens element, the image-side surface of the second lens element having a concave portion in the vicinity of the optical axis, and the image-side surface of the fifth lens element having a concave portion in the vicinity of the optical axis are beneficial to converge light.

2. The image-side surface of the fourth lens element having a convex portion in the vicinity of the optical axis and the object-side surface of the fifth lens element having a convex portion in the vicinity of the optical axis may achieve the effect of correcting the overall aberration. The object-side surface of the second lens element having a convex portion in the vicinity of the periphery of the second lens element, the object-side surface of the third lens element having a concave portion in the vicinity of the periphery of the third lens element, and the image-side surface of the third lens element having a convex portion in the vicinity of the periphery of the third lens element may effectively correct the aberration of the local imaging of the object.

3. The second lens element having negative refracting power is adapted to eliminate the aberration generated by the first lens element.

4. The fourth lens element having positive refracting power is beneficial to a major correction of each of the aberrations.

5. Optionally, the design with the aperture stop being aligned with the position of the object-side surface of the first lens element on the optical axis may effectively shorten the system length, and the third lens element having positive refracting power may achieve the effect of improving the image quality.

6. The optical lens assembly can achieve a preferable configuration by satisfying at least one of the following conditional limitations:

$3.1 \leq ALT/AAG$, preferably $3.1 \leq ALT/AAG \leq 5.5$, optimally $2.8 \leq ALT/AAG \leq 5.5$;

$ALT/BFL \leq 3$, preferably $1.4 \leq ALT/BFL \leq 3$;

$(T1+T4+T5)/(T3+T4) \leq 2.4$, preferably $1.2 \leq (T1+T4+T5)/(T3+T4) \leq 2.4$;

$BFL/(T1+T2) \leq 1.6$, preferably $1.0 \leq BFL/(T1+T2) \leq 1.6$;

$AAG/(G2+G3) \leq 1.4$, preferably $1.1 \leq AAG/(G2+G3) \leq 1.4$;

$(T1+T4+T5)/BFL \leq 1.4$, preferably $0.9 \leq (T1+T4+T5)/BFL \leq 1.4$;

$ALT/(T1+T2) \leq 3.1$, preferably $2.6 \leq ALT/(T1+T2) \leq 3.1$;

$AAG/(G1+G4) \leq 6.1$, preferably $2.5 \leq AAG/(G1+G4) \leq 6.1$; and $(G2+G3)/(G1+G4) \leq 5.2$, preferably $1.5 \leq (G2+G3)/(G1+G4) \leq 5.2$.

7. The parameters being too small to be detrimental to manufacturing or the system length being too long due to parameters being too big may be avoided, when the optical lens assembly satisfies at least one of the following conditional limitations:

$EFL/TL \leq 1.2$, preferably $0.8 \leq EFL/TL \leq 1.2$;

$TTL/TL \leq 1.5$, preferably $1.2 \leq TTL/TL \leq 1.5$;

$TTL/(T3+T4) \leq 6.5$, preferably $3.5 \leq TTL/(T3+T4) \leq 6.5$;

$TL/BFL \leq 4.1$, preferably $1.9 \leq TL/BFL \leq 4.1$;

$TTL/BFL \leq 3.6$, preferably $2.9 \leq TTL/BFL \leq 3.6$; and $TL/(T3+T4) \leq 4.8$, preferably $2.5 \leq TL/(T3+T4) \leq 4.8$.

8. The field of view can be widened while thinning the thickness of the optical lens assembly when at least one of the following conditional limitations is satisfied:

$EFL/(G1+G4) \leq 30$, preferably $8.6 \leq EFL/(G1+G4) \leq 30$;

$EFL/(T1+T2) \leq 4.8$, preferably $3.2 \leq EFL/(T1+T2) \leq 4.8$; and $EFL/TL \leq 1.2$, preferably $1.0 \leq EFL/TL \leq 1.2$.

9. The effect of reducing the volume of the optical lens assembly may be achieved when at least one of the following conditional limitations is satisfied: $ALT/BFL \leq 3$, $(T1+T4+T5)/(T3+T4) \leq 2.4$, $BFL/(T1+T2) \leq 1.6$, $AAG/(G2+G3) \leq 1.4$, $(T1+T4+T5)/BFL \leq 1.4$, $ALT/(T1+T2) \leq 3.1$, $AAG/(G1+G4) \leq 6.1$, $(G2+G3)/(G1+G4) \leq 5.2$, $EFL/TL \leq 1.2$, $TTL/TL \leq 1.5$, $TTL/(T3+T4) \leq 6.5$, $TL/BFL \leq 4.1$, $TTL/BFL \leq 3.6$, $TL/(T3+T4) \leq 4.8$, $EFL/(G1+G4) \leq 30$, $EFL/(T1+T2) \leq 4.8$, and $EFL/TL \leq 1.2$.

10. An excellent image quality can be produced when at least one of the following conditional limitations is satisfied: $1.4 \leq ALT/BFL \leq 3$, $1.2 \leq (T1+T4+T5)/(T3+T4) \leq 2.4$, $1.0 \leq BFL/(T1+T2) \leq 1.6$, $1.1 \leq AAG/(G2+G3) \leq 1.4$, $0.9 \leq (T1+T4+T5)/BFL \leq 1.4$, $2.6 \leq ALT/(T1+T2) \leq 3.1$, $2.5 \leq AAG/(G1+G4) \leq 6.1$, $1.5 \leq (G2+G3)/(G1+G4) \leq 5.2$, $0.8 \leq EFL/TL \leq 1.2$, $1.2 \leq TTL/TL \leq 1.5$, $3.5 \leq TTL/(T3+T4) \leq 6.5$, $1.9 \leq TL/BFL \leq 4.1$, $2.9 \leq TTL/BFL \leq 3.6$, $2.5 \leq TL/(T3+T4) \leq 4.8$, $8.6 \leq EFL/(G1+G4) \leq 30$, $3.2 \leq EFL/(T1+T2) \leq 4.8$, and $1.0 \leq EFL/TL \leq 1.2$.

11. The optical lens assembly can have a better configuration and can maintain the appropriate yield under the premise of good image quality when the optical lens assembly satisfies: $3.1 \leq ALT/AAG$.

12. The optical lens assembly may further maintain a proper volume if the following conditional limitation is satisfied: $3.1 \leq ALT/AAG \leq 5.5$, preferably $2.8 \leq ALT/AAG \leq 5.5$.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. An optical lens assembly, comprising a first lens element, a second lens element, a third lens element, a fourth lens element, and a fifth lens element arranged in a sequence from an object side to an image side along an optical axis, and each of the first lens element to the fifth lens element comprising an object-side surface facing the object side and allowing imaging rays to pass through as well as an image-side surface facing the image side and allowing the imaging rays to pass through;

the image-side surface of the first lens element having a concave portion in a vicinity of a periphery of the first lens element;

the second lens element having negative refracting power, the object-side surface of the second lens element having a convex portion in a vicinity of a periphery of the second lens element, and the image-side surface of the second lens element having a concave portion in a vicinity of the optical axis;

the object-side surface of the third lens element having a concave portion in a vicinity of a periphery of the third lens element, and the image-side surface of the third lens element having a convex portion in the vicinity of the periphery of the third lens element;

the fourth lens element having positive refracting power, and the image-side surface of the fourth lens element having a convex portion in the vicinity of the optical axis;

the object-side surface of the fifth lens element having a convex portion in the vicinity of the optical axis, and the image-side surface of the fifth lens element having a concave portion in the vicinity of the optical axis; and only the first lens element to the fifth lens element having refracting power, wherein the optical lens assembly satisfies:

$3.1 \leq ALT/AAG$, wherein ALT is a sum of thicknesses of the first lens element, the second lens element, the third lens element, the fourth lens element, and the fifth lens element on the optical axis, and AAG is a sum of four air gaps from the first lens element to the fifth lens element on the optical axis.

2. The optical lens assembly as recited in claim 1, wherein the optical lens assembly further satisfies: $ALT/BFL \leq 3$, wherein BFL is a distance from the image-side surface of the fifth lens element to an image plane on the optical axis.

3. The optical lens assembly as recited in claim 1, wherein the optical lens assembly further satisfies: $EFL/TL \leq 1.2$, wherein EFL is an effective focal length of the optical lens assembly, and TL is a distance from the object-side surface of the first lens element to the image-side surface of the fifth lens element on the optical axis.

4. The optical lens assembly as recited in claim 1, wherein the optical lens assembly further satisfies: (T1+T4+T5)/(T3+T4)≤2.4, wherein T1 is the thickness of the first lens element on the optical axis, T3 is the thickness of the third lens element on the optical axis, T4 is the thickness of the fourth lens element on the optical axis, and T5 is the thickness of the fifth lens element on the optical axis.

5. The optical lens assembly as recited in claim 1, wherein the optical lens assembly further satisfies: BFL/(T1+T2)≤1.6, wherein BFL is a distance from the image-side surface of the fifth lens element to an image plane on the optical axis, T1 is the thickness of the first lens element on the optical axis, and T2 is the thickness of the second lens element on the optical axis.

6. The optical lens assembly as recited in claim 1, wherein the optical lens assembly further satisfies: EFL/(G1+G4)≤30, wherein EFL is an effective focal length of the optical lens assembly, G1 is the air gap from the first lens element to the second lens element on the optical axis, and G4 is the air gap from the fourth lens element to the fifth lens element on the optical axis.

7. The optical lens assembly as recited in claim 1, wherein the optical lens assembly further satisfies: AAG/(G2+G3)≤1.4, wherein G2 is the air gap from the second lens element to the third lens element on the optical axis, and G3 is the air gap from the third lens element to the fourth lens element on the optical axis.

8. The optical lens assembly as recited in claim 1, wherein the optical lens assembly further satisfies: TTL/TL≤1.5, wherein TTL is a distance from the object-side surface of the first lens element to an image plane on the optical axis, and TL is a distance from the object-side surface of the first lens element to the image-side surface of the fifth lens element on the optical axis.

9. The optical lens assembly as recited in claim 1, wherein the optical lens assembly further satisfies: TTL/(T3+T4)≤6.5, wherein TTL is a distance from the object-side surface of the first lens element to an image plane on the optical axis, T3 is the thickness of the third lens element on the optical axis, and T4 is the thickness of the fourth lens element on the optical axis.

10. The optical lens assembly as recited in claim 1, wherein the optical lens assembly further satisfies: TL/BFL≤4.1, wherein TL is a distance from the object-side surface of the first lens element to the image-side surface of the fifth lens element on the optical axis, and BFL is a distance from the image-side surface of the fifth lens element to an image plane on the optical axis.

11. An optical lens assembly, comprising an aperture stop, a first lens element, a second lens element, a third lens element, a fourth lens element, and a fifth lens element arranged in a sequence from an object side to an image side along an optical axis, and each of the first lens element to the fifth lens element comprising an object-side surface facing the object side and allowing imaging rays to pass through as well as an image-side surface facing the image side and allowing the imaging rays to pass through;

the image-side surface of the first lens element having a concave portion in a vicinity of a periphery of the first lens element;
the second lens element having negative refracting power, the object-side surface of the second lens element having a convex portion in a vicinity of a periphery of the second lens element, and the image-side surface of the second lens element having a concave portion in a vicinity of the optical axis;
the third lens element having positive refracting power, the object-side surface of the third lens element having a concave portion in a vicinity of a periphery of the third lens element, and the image-side surface of the third lens element having a convex portion in the vicinity of the periphery of the third lens element;
the fourth lens element having positive refracting power, and the image-side surface of the fourth lens element having a convex portion in the vicinity of the optical axis;
the object-side surface of the fifth lens element having a convex portion in the vicinity of the optical axis, and the image-side surface of the fifth lens element having a concave portion in the vicinity of the optical axis; and
only the first lens element to the fifth lens element having refracting power, wherein the optical lens assembly satisfies:
2.8≤ALT/AAG,
wherein ALT is a sum of thicknesses of the first lens element, the second lens element, the third lens element, the fourth lens element, and the fifth lens element on the optical axis, and AAG is a sum of four air gaps from the first lens element to the fifth lens element on the optical axis.

12. The optical lens assembly as recited in claim 11, wherein the optical lens assembly further satisfies: ALT/BFL≤3, wherein BFL is a distance from the image-side surface of the fifth lens element to an image plane on the optical axis.

13. The optical lens assembly as recited in claim 11, wherein the optical lens assembly further satisfies: EFL/TL≤1.2, wherein EFL is an effective focal length of the optical lens assembly, and TL is a distance from the object-side surface of the first lens element to the image-side surface of the fifth lens element on the optical axis.

14. The optical lens assembly as recited in claim 11, wherein the optical lens assembly further satisfies: (T1+T4+T5)/BFL≤1.4, wherein T1 is the thickness of the first lens element on the optical axis, T4 is the thickness of the fourth lens element on the optical axis, T5 is the thickness of the fifth lens element on the optical axis, and BFL is a distance from the image-side surface of the fifth lens element to an image plane on the optical axis.

15. The optical lens assembly as recited in claim 11, wherein the optical lens assembly further satisfies: ALT/(T1+T2)≤3.1, wherein T1 is the thickness of the first lens element on the optical axis, and T2 is the thickness of the second lens element on the optical axis.

16. The optical lens assembly as recited in claim 11, wherein the optical lens assembly further satisfies: AAG/(G1+G4)≤6.1, wherein G1 is the air gap from the first lens element to the second lens element on the optical axis, and G4 is the air gap from the fourth lens element to the fifth lens element on the optical axis.

17. The optical lens assembly as recited in claim 11, wherein the optical lens assembly further satisfies: EFL/(T1+T2)≤4.8, wherein EFL is an effective focal length of the optical lens assembly, T1 is the thickness of the first lens element on the optical axis, and T2 is the thickness of the second lens element on the optical axis.

18. The optical lens assembly as recited in claim 11, wherein the optical lens assembly further satisfies: (G2+G3)/(G1+G4)≤5.2, wherein G1 is the air gap from the first lens element to the second lens element on the optical axis, G2 is the air gap from the second lens element to the third lens element on the optical axis, G3 is the air gap from the third lens element to the fourth lens element on the optical axis, and G4 is the air gap from the fourth lens element to the fifth lens element on the optical axis.

19. The optical lens assembly as recited in claim 11, wherein the optical lens assembly further satisfies: TTL/BFL≤3.6, wherein TTL is a distance from the object-side surface of the first lens element to an image plane on the optical axis, and BFL is a distance from the image-side surface of the fifth lens element to an image plane on the optical axis.

20. The optical lens assembly as recited in claim 11, wherein the optical lens assembly further satisfies: TL/(T3+T4)≤4.8, wherein TL is a distance from the object-side surface of the first lens element to the image-side surface of the fifth lens element on the optical axis, T3 is the thickness of the third lens element on the optical axis, and T4 is the thickness of the fourth lens element on the optical axis.

* * * * *